United States Patent
Hozumi

(10) Patent No.: US 8,970,904 B2
(45) Date of Patent: Mar. 3, 2015

(54) PRINTING APPARATUS, METHOD AND COMPUTER PROGRAM FORMING AN ENGRAVED IMAGE ON A RECORDING MEDIUM

(71) Applicant: Canon Kabushiki Kaisha, Tokyo (JP)

(72) Inventor: Yasushi Hozumi, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/826,767

(22) Filed: Mar. 14, 2013

(65) Prior Publication Data

US 2013/0250321 A1  Sep. 26, 2013

(30) Foreign Application Priority Data

Mar. 23, 2012 (JP) ................. 2012-068101

(51) Int. Cl.
*G06K 1/00* (2006.01)
*G06K 15/02* (2006.01)
*B41J 2/325* (2006.01)
*G03G 15/20* (2006.01)
*B41J 2/01* (2006.01)

(52) U.S. Cl.
CPC .............. *G06K 15/02* (2013.01); *G06K 15/028* (2013.01); *B41J 2/325* (2013.01)
USPC ............. 358/1.9; 358/518; 399/341; 347/107

(58) Field of Classification Search
None
See application file for complete search history.

(56) References Cited

U.S. PATENT DOCUMENTS

| | | | | |
|---|---|---|---|---|
| 4,887,096 A * | 12/1989 | Asakura et al. | ................ | 347/172 |
| 5,721,578 A * | 2/1998 | Nakai et al. | ................... | 347/183 |
| 8,465,145 B2 * | 6/2013 | Usuda et al. | ................... | 347/102 |
| 8,638,481 B2 * | 1/2014 | Miyadera et al. | ............. | 358/518 |
| 8,712,165 B2 * | 4/2014 | Mita | ............................. | 382/199 |
| 2002/0109899 A1 * | 8/2002 | Ohtaka et al. | ................. | 359/245 |
| 2012/0155939 A1 * | 6/2012 | Fukatsu et al. | ................ | 399/341 |

FOREIGN PATENT DOCUMENTS

JP    2009073034 A    4/2009

* cited by examiner

*Primary Examiner* — Steven Kau
(74) *Attorney, Agent, or Firm* — Canon USA Inc. IP Division

(57) ABSTRACT

A printer apparatus configured to form an image on a recording medium by providing a heat amount according to a gradation includes a first image forming unit configured to form a first image by transferring ink to the recording medium, and a second image forming unit configured to form a second image by forming concavity and convexity on the recording medium. The second image forming unit forms concavity and convexity on a surface of the recording medium by setting one of a gradation of a drawing region of the second image and a gradation of a drawing peripheral region surrounding the drawing region higher than a predetermined threshold gradation, and setting the other of the gradation of the drawing region and the gradation of the drawing peripheral region lower than the predetermined threshold gradation.

12 Claims, 23 Drawing Sheets

CROSS SECTION OF SHEET
OF IMAGE PRINTED PRODUCT

CROSS SECTION OF SHEET
OF IMAGE PRINTED PRODUCT

CROSS SECTION OF SHEET
OF IMAGE PRINTED PRODUCT

CROSS SECTION OF SHEET
OF IMAGE PRINTED PRODUCT

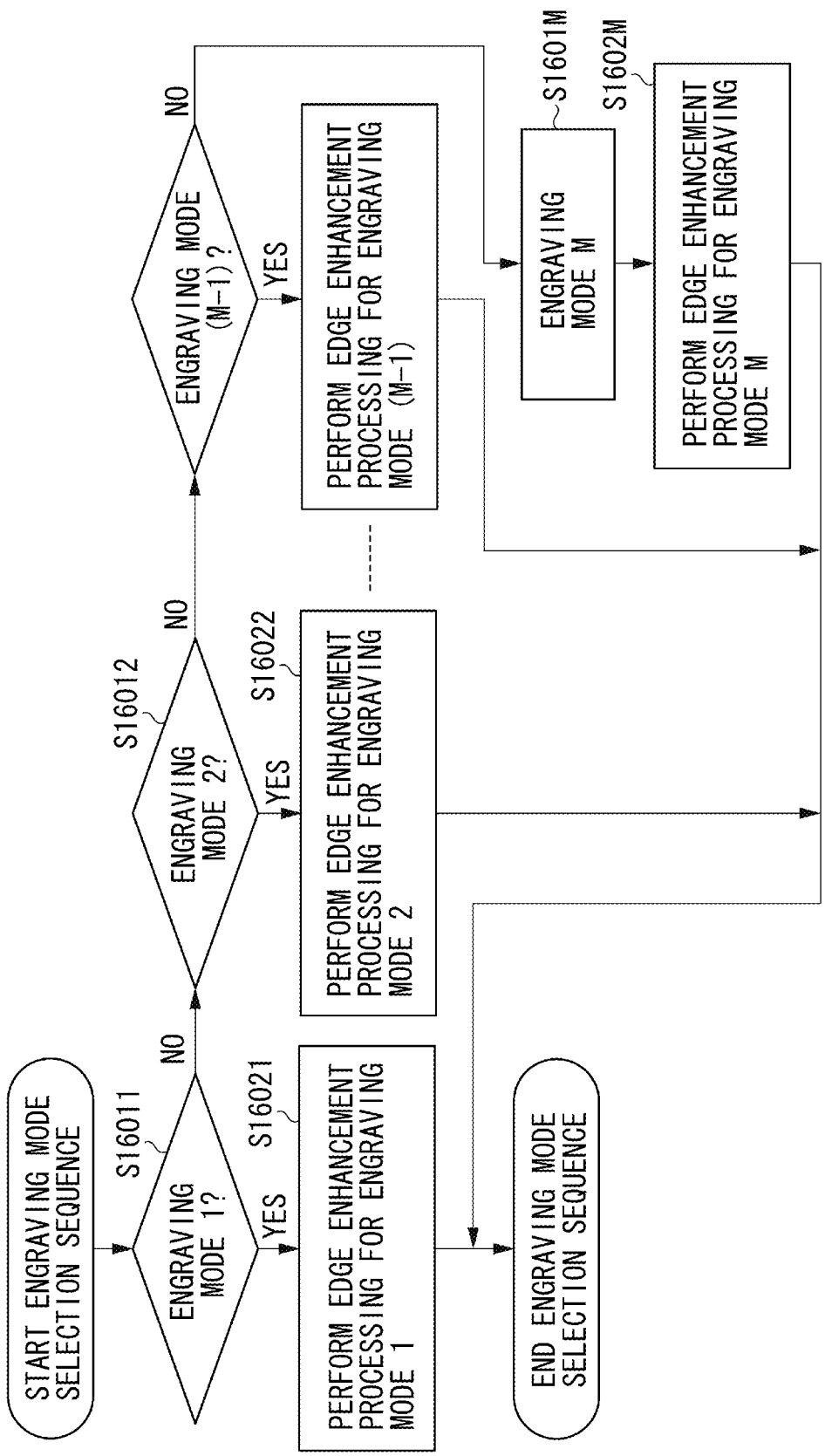

PRINTING APPARATUS, METHOD AND COMPUTER PROGRAM FORMING AN ENGRAVED IMAGE ON A RECORDING MEDIUM

BACKGROUND OF THE INVENTION

1. Field of the Invention

The present invention relates to a printer apparatus, a printing method, and a program. In particular, the present invention relates to a printer apparatus capable of printing, on an image, other image information such as characters such as a date and a name, and a decorative frame, a printing method for the printer apparatus, and a program for performing printing by the printer apparatus.

2. Description of the Related Art

A thermal transfer type printer apparatus uses an ink sheet and a recording sheet, selectively drives a plurality of heating elements arranged in a main scanning direction, and conveys the ink sheet and the recording sheet in a sub scanning direction, thereby printing an image on the recording sheet in a dot line manner. When an image captured by an input apparatus such as a digital camera is printed with use of the thermal transfer type printer apparatus, sometimes a date when the image was captured is printed within the image by utilizing a clock provided in the input apparatus. However, a viewer may have a significantly uncomfortable feeling to printed characters such as a date depending on the image that is a print target. With the aim of solving such an uncomfortable feeling, for example, there is a technique discussed in Japanese Patent Application Laid-Open No. 2009-73034. A thermal transfer type printer apparatus discussed in Japanese Patent Application Laid-Open No. 2009-73034 can record information by an overcoat layer by changing a transfer amount of a protective ink for forming the overcoat layer. More specifically, this thermal transfer type printer changes an applied amount (i.e., a thickness) of the overcoat layer by controlling an output (a heat amount) of a thermal head. As a result, the thermal transfer type printer apparatus forms concavity and convexity on the surface of the overcoat layer to print information.

SUMMARY OF THE INVENTION

The present invention is directed to a printer apparatus capable of forming an engraved image by forming concavity and convexity on a recording sheet, a printing method, and a program.

According to an aspect of the present invention, a printer apparatus configured to form an image on a recording medium by providing a heat amount according to a gradation includes a first image forming unit configured to form a first image by transferring ink to the recording medium, and a second image forming unit configured to form a second image by forming concavity and convexity on the recording medium, wherein the second image forming unit forms concavity and convexity on a surface of the recording medium by setting one of a gradation of a drawing region of the second image and a gradation of a drawing peripheral region surrounding the drawing region higher than a predetermined threshold gradation and setting the other of the gradation of the drawing region and the gradation of the drawing peripheral region lower than the predetermined threshold gradation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 16 is a flowchart illustrating the details of step S1206 as the engraving mode selection sequence in a case where the printer apparatus has M types of engraving modes.

DESCRIPTION OF THE EMBODIMENTS

Various exemplary embodiments, features, and aspects of the invention will be described in detail below with reference to the drawings.

A printer apparatus according to exemplary embodiments of the present invention is a thermal transfer type printer apparatus. Then, the printer apparatus according to the exemplary embodiments of the present invention uses a thermally deformable recording sheet, i.e., a recording sheet capable of being embossed by being heated as a recording medium. Embossing is processing of forming concavity and convexity on a recording sheet by changing a thickness of the recording sheet according to a heated heat amount.

In the following description, the term "printing" will be used to indicate an entire series of processes and operations from execution of image printing based on a print instruction from a user to a discharge of a printed sheet. Further, the term "image printing" will be used to indicate a process and an operation of forming an image on a recording sheet by, for example, thermally transferring a transfer material (an ink or an overcoat) applied on an ink sheet to the recording sheet, as a part of the printing.

Figure 1:
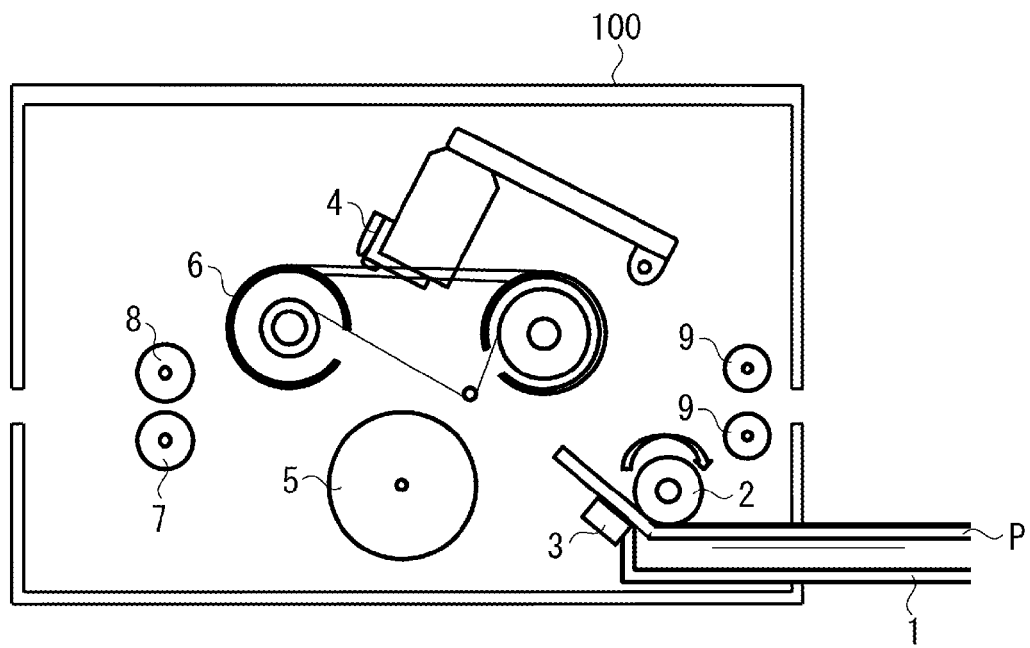
FIG. 1 schematically illustrates an outline of a configuration of a main body portion of a printer apparatus.

First, an entire configuration of a printer apparatus 20 according to the respective exemplary embodiments of the present invention will be described with reference to FIG. 1. FIG. 1 schematically illustrates an outline of a configuration of a main body portion 100 of the printer apparatus 20 according to the respective exemplary embodiments of the present invention.

As illustrated in FIG. 1, the printer apparatus 20 perform printing with use of a recording sheet cassette 1 and an ink sheet 6 mounted on the main body portion 100. Recording sheets P as recording media are stacked on the recording sheet cassette 1. Thermally deformable sheets (sheets capable of being embossed by being heated) are employed as the recording sheets P. The ink sheet 6 is configured in such a manner that surfaces of a plurality of kinds of transfer materials are arranged on a surface of a base sheet. The surfaces of the plurality of kinds of transfer materials include color ink surfaces for performing full color printing, and a surface of an overcoat material for forming an overcoat layer. Both the recording sheet cassette 1 and the ink sheet 6 are configured so as to be detachably attachable to the main body portion 100. A thermal head 4 is provided in the main body portion 100. The thermal head 4 is disposed in such a manner that a plurality of heating elements (not illustrated) is arranged along a longitudinal direction.

The thermal head 4 and a platen roller 5 are disposed in the main body portion 100 of the printer apparatus 20 so as to sandwich the recording sheet P and the ink sheet 6 therebetween. The longitudinal direction of the thermal head 4 and a rotational axis of the platen roller 5 are substantially in parallel with each other. During an image printing operation, the thermal head 4 moves toward the platen roller 5 and approaches the platen roller 5. Then, the thermal head 4 and the platen roller 5 sandwich the ink sheet 6 and the recording sheet P therebetween at a predetermined pressure.

The illustrated example is configured in such a manner that the platen roller 5 is fixed to a base frame of the main body portion 100, and the thermal head 4 is movable. However, the configuration of the printer apparatus 20 is not limited thereto. For example, the printer apparatus 20 may be configured in such a manner that the thermal head 4 is fixed to the base frame of the main body portion 100 of the printer apparatus 20, and the platen roller 5 is movable. Alternatively, the printer apparatus 20 may be configured in such a manner that both the thermal head 4 and the platen roller 5 are movable. Any of these configurations can provide an effect of the exemplary embodiments of the present invention.

The main body portion 100 of the printer apparatus 20 includes a sheet feeding roller 2 and a separation unit 3. The sheet feeding roller 2 and the separation unit 3 are a mechanism that feeds an uppermost single sheet among the recording sheets P stacked on the recording sheet cassette 1. Only an uppermost single recording sheet P is separated and fed from the other recording sheets P by the sheet feeding roller 2 and the separation unit 3, and is conveyed toward between the thermal head 4 and the platen roller 5.

The main body portion 100 of the printer apparatus 20 includes a grip roller 7 and a pinch roller 8. The grip roller 7 and the pinch roller 8 are a mechanism that conveys the recording sheet P at a predetermined speed during an image printing operation. The grip roller 7 rotates at a constant speed by a not-illustrated motor. Then, the grip roller 7 holds the recording sheet P by extremely small protrusions formed on a surface of the grip roller 7 to convey the recording sheet P. As a direction in which the recording sheet P is conveyed, there are two directions, i.e., a direction during an image printing operation and a direction in which the recording sheet P is pulled back to an image printing start position before a next image printing operation. These directions are opposite directions from each other.

Further, the main body portion 100 of the printer apparatus 20 includes a sheet discharge roller pair 9. The sheet discharge roller pair 9 is a sheet discharge mechanism for discharging an image printed product (the recording sheet P with an image printed thereon will be hereinafter referred to as an "image printed product") to the outside of the main body portion 100, after completion of image printing. For example, a lower roller of the sheet discharge roller pair 9 rotates in a sheet discharge direction by a not-illustrated motor, and discharges an image printed product. As a result, a user or the like can acquire the image printed product outside of the main body portion 100 of the printer apparatus 20.

Figure 2:
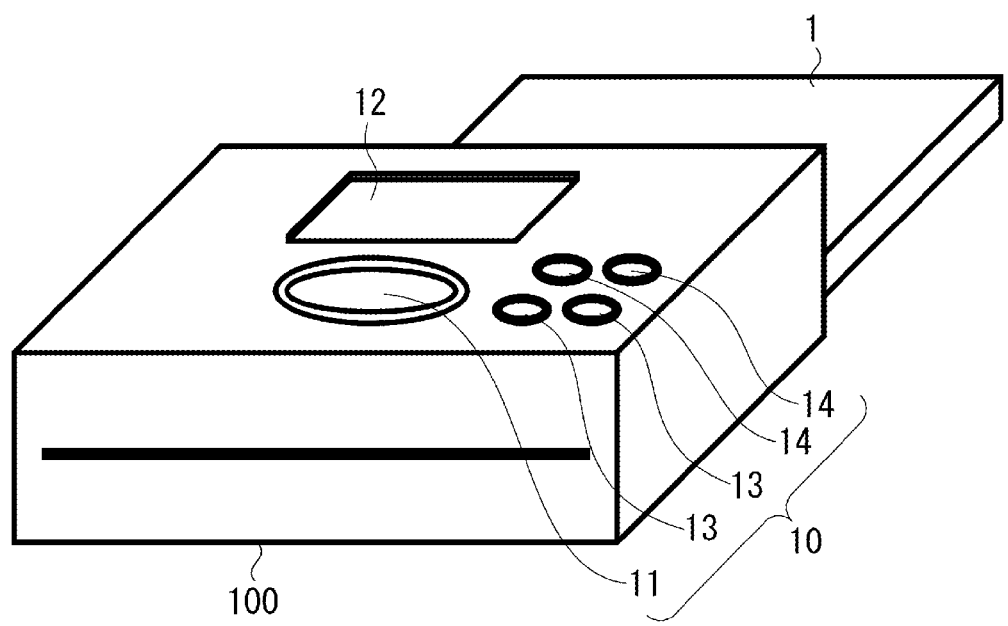
FIG. 2 is a perspective view schematically illustrating an outer appearance of the main body portion of the printer apparatus.

Next, a user interface of the printer apparatus 20 will be described. FIG. 2 is a perspective view schematically illustrating an outer appearance of the main body portion 100 of the printer apparatus 20. Especially, FIG. 2 illustrates the user interface of the main body portion 100 of the printer apparatus 20.

As illustrated in FIG. 2, an operation unit 10 and a display unit 12 are disposed at the main body portion 100 of the printer apparatus 20.

The operation unit 10 is a unit that a user operates to select an image printing mode and an engraving mode, and set another printing condition. The operation unit 10 includes image printing mode switching buttons 13, engraving mode switching buttons 14, and a printing start button 11. The image printing mode switching buttons 13 are buttons that a user uses to switch the image printing mode. The engraving mode switching buttons 14 are buttons that a user uses to switch the engraving mode. The "image printing mode" and the "engraving mode" will be described below. Further, in a first exemplary embodiment, the operation unit 10 does not necessarily have to include the engraving mode switching buttons 14. The printing start button 11 is a button that a user uses to start printing. When the printing start button 11 is pressed, the printer apparatus 20 starts printing. The printing processing and operation will be described below.

The display unit 12 displays image data that will be an image printing target, displays a menu that allows a user to set printing conditions, and displays various kinds of information.

Figure 3:
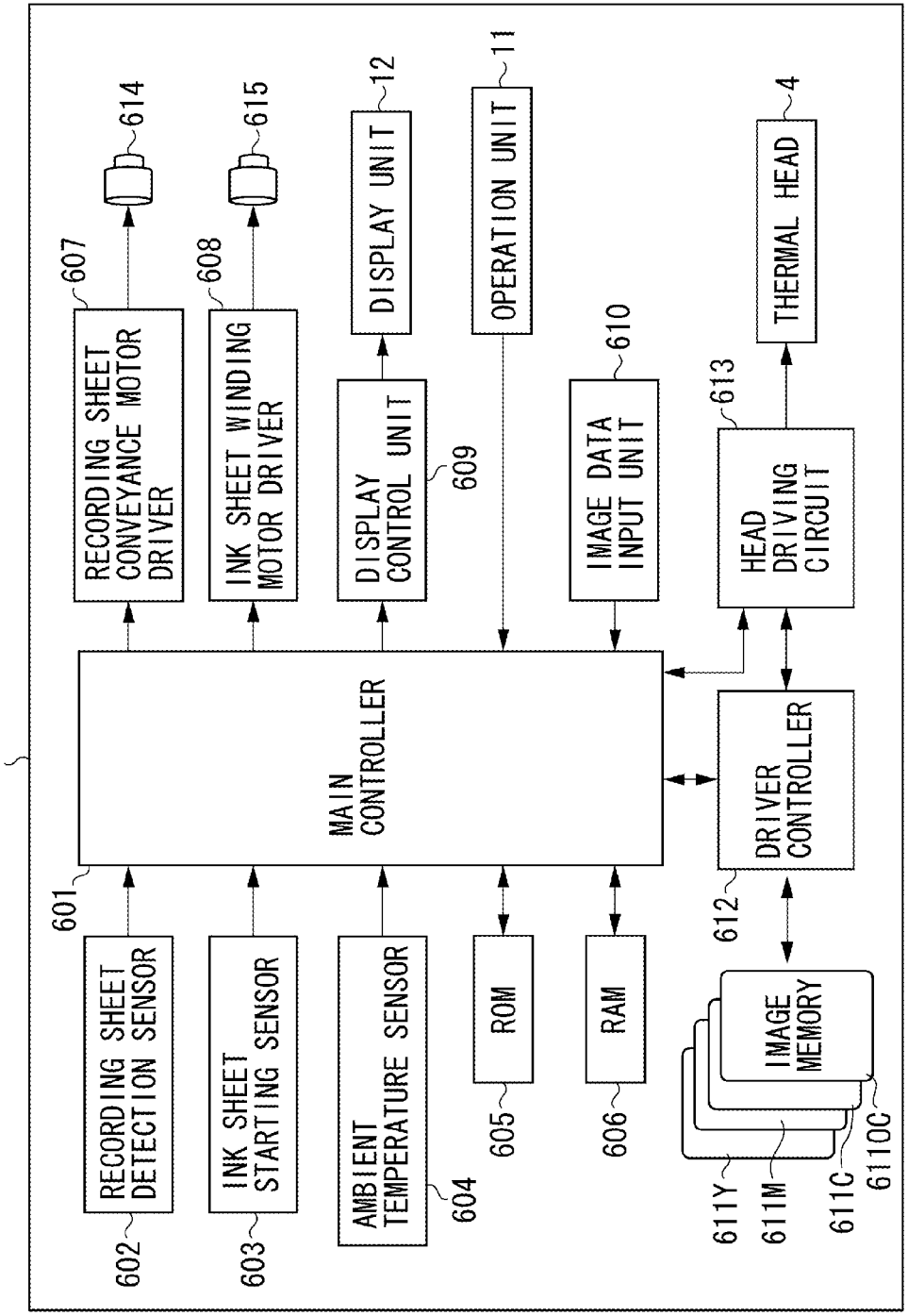
FIG. 3 is a functional block diagram schematically illustrating a configuration of the printer apparatus.

Next, a configuration of the printer apparatus 20 will be described with reference to FIG. 3. FIG. 3 is a functional block diagram schematically illustrating the configuration of the printer apparatus 20.

The printer apparatus 20 includes a main controller 601. The main controller 601 controls the entire printer apparatus 20. The main controller 601 functions as an image processing unit, and performs various kinds of processing that will be described below.

The printer apparatus 20 further includes a recording sheet detection sensor 602. The recording sheet detection sensor 602 is disposed near the sheet feeding roller 2, and detects a leading edge of the recording sheet P fed from the recording sheet cassette 1. Then, the main controller 601 of the printer apparatus 20 starts image printing by utilizing a detection result of the recording sheet detection sensor 602. For example, the main controller 601 determines that image printing start timing is timing after a predetermined time according to a size of the recording sheet P (a sheet size) has elapsed from timing when the recording sheet detection sensor 602 detects the recording sheet P.

The printer apparatus 20 further includes an ink sheet starting sensor 603. The ink sheet starting sensor 603 detects an identification zone disposed at a leading edge of a surface of each transfer material of the ink sheet 6.

The printer apparatus 20 further includes an ambient temperature sensor 604. The ambient temperature sensor 604 detects an ambient temperature in an environment where the main body portion 100 of the printer apparatus 20 is placed.

The printer apparatus 20 further includes a read only memory (ROM) 605. The ROM 605 is connected to the main controller 601, and stores a control program and others. The main controller 601 operates according to the control program stored in the ROM 605. Further, the ROM 605 functions as a storage unit that stores a setting of the image printing mode, which will be described below, a control program such as an image engraving processing sequence according to the setting of the image printing mode, and various kinds of settings for use in printing.

The printer apparatus 20 further includes a random access memory (RAM) 606. The RAM 606 is used as a work memory for calculation processing of the main controller 601. Further, the RAM 606 is also used to temporarily store various kinds of setting data and others input via the operation unit 10.

The printer apparatus 20 further includes a recording sheet conveyance motor driver 607. The printer apparatus 20 further includes a driving motor 614. The recording sheet conveyance motor driver 607 drives the driving motor 614 under control of the main controller 601. The driving motor 614 is connected to the sheet feeding roller 2, the grip roller 7, the sheet discharge roller pair 9, and others via a not-illustrated rotational mechanism so as to be able to transmit power. Then, these rollers are driven by the power of the driving motor 614, thereby conveying the recording sheet P.

The printer apparatus 20 further includes an ink sheet winding motor driver 608. The printer apparatus 20 further includes an ink sheet winding motor 615. The ink sheet winding motor driver 608 controls a rotation of the ink sheet winding motor 615 under control of the main controller 601. In such a state that the ink sheet 6 is mounted, a take-up roller (not illustrated) of the ink sheet 6 and the ink sheet winding motor 615 are connected to each other via a rotational mechanism. Then, the ink sheet winding motor driver 608 controls take-up and winding of the ink sheet 6 based on control of the main controller 601.

The printer apparatus 20 further includes a display control unit 609. The display control unit 609 controls the display unit 12. Then, as described above, the display unit 12 displays image data that will become a printing target, the menu that allows a user to set printing conditions, and various kinds of information under control of the display control unit 609.

The printer apparatus 20 further includes an image data input unit 610. Image data that will become an image printing target is input from a recording medium attached to the printer apparatus 20, and various kinds of external apparatuses (for example, an imaging apparatus and a data recording device) connected to the printer apparatus 20 into the image data input unit 610. The input image data includes image data for full color image printing (image data including information of a luminance gradation and a color of each pixel), image data of an overcoat layer, and image data of an engraved image M. Then, the main controller 601 functions as the image processing unit, and generates image printing data to be used in image printing by using the image data input into the image data input unit 610. The printer apparatus 20 further includes a yellow image buffer 611Y, a magenta image buffer 611M, a cyan image buffer 611C, and an image buffer 611OC for an overcoat layer. These image buffers 611Y, 611M, 611C, and 611OC temporarily store yellow image data, magenta image data, cyan image data, and image data of an overcoat layer input into the image data input unit 610, respectively. The image data stored in the yellow, magenta, and cyan image buffers 611Y, 611M, and 611C is image data to be used in full color image printing. The image data stored in the image buffer 611OC for an overcoat layer is image data to be used in engraving processing, which will be described below. Therefore, the contents are totally different between the image data stored in the image buffers 611Y, 611M, and 611C, and the image data stored in the image buffer 611OC.

The printer apparatus 20 further includes a head driving circuit 613. The head driving circuit 613 drives heating elements built in the thermal head 4 under control of a driver controller 612. Further, the head driving circuit 613 controls energy (power) to be supplied to the thermal head 4 based on a detection result of the ambient temperature sensor 604. Then, the main controller 601 controls the driver controller 612. The driver controller 612 controls the head driving circuit 613 with use of image printing data that the main controller 601 as the image processing unit generates with use of the image data recorded in the image buffers 611Y, 611M, 611C, and 611OC. Then, the head driving circuit 613 supplies power according to a gradation of each pixel in the image data to each heating element of the thermal head 4. Then, each heating element of the thermal head 4 generates heat according to the magnitude of the supplied power (i.e., the gradation of the image printing data). As a result, full color image printing, formation of an overcoat layer, and formation of the engraved image M are performed. Image data in a bitmap format is stored in the image buffers 611Y, 611M, 611C, and 611OC.

The printer apparatus 20 is configured in the above-described manner.

Figure 4:
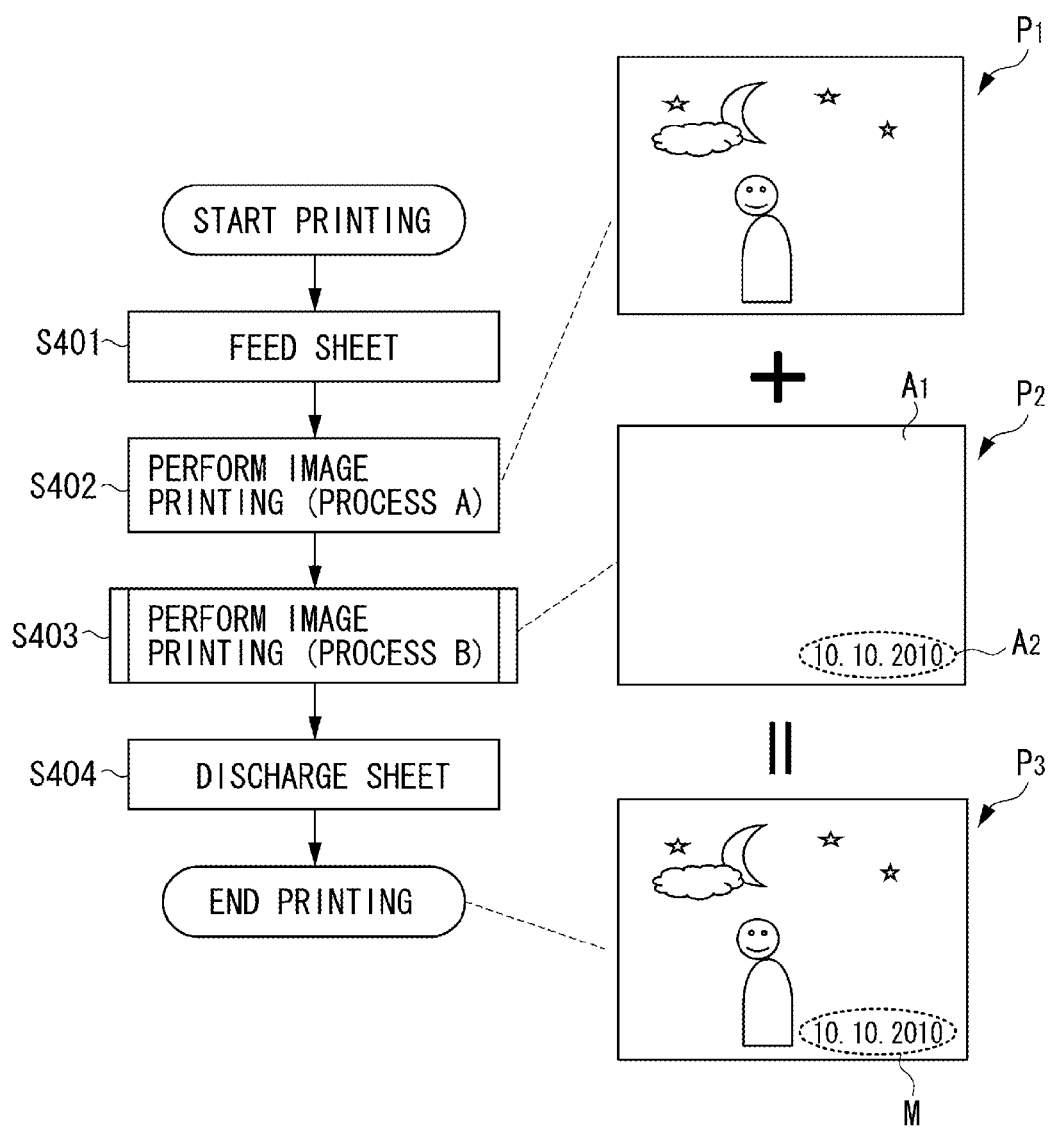
FIG. 4 is a diagram schematically illustrating a flowchart indicating an entire flow of printing processing of the printer apparatus, and images printed in respective processes in the printing processing.

Next, an entire flow of printing processing of the printer apparatus 20 will be described with reference to FIG. 4. FIG. 4 is a diagram schematically illustrating a flowchart indicating the entire flow of the printing processing of the printer apparatus 20, and images printed in respective processes of the printing processing. The printing processing illustrated in FIG. 4 is stored in the ROM 605, which corresponds to the storage unit, as a computer program (computer software). The main controller 601 of the printer apparatus 20 reads out the computer program from the ROM 605 to execute it. This execution realizes the printing processing.

As illustrated in FIG. 4, the printing processing includes step S401 as a sheet feeding sequence, step S402 as an image printing sequence for performing a process A, step S403 as an image printing sequence for performing a process B, and step S404 as a sheet discharge sequence. The process A is a process including formation of a full color image as a first image. The process B is a process including formation of the engraved image M as a second image. Hereinafter, the image printing sequence for performing the process A will be abbreviated as "the image printing sequence (the process A)", and the image printing sequence for performing the process B will be abbreviated as "the image printing sequence (the process B)".

When a user presses the printing start button 11, first, the main controller 601 performs step S401 as the sheet feeding sequence. Step S401 as the sheet feeding sequence is a sequence for feeding the recording sheet P into an image printing portion (an area where the thermal head 4 and the platen roller 5 are in contact with each other during image printing).

Next, the main controller 601 performs step S402 as the image printing sequence (the process A). Step S402 as the image printing sequence (the process A) includes a sequence for printing an image on the recording sheet P with use of pigment transfer materials (i.e., color inks of respective colors) of the ink sheet 6. An image $P_1$ illustrated at the right side of the flowchart of FIG. 4 is an example of an image (the first image) printed in step S402 as the image printing sequence (the process A). As illustrated in FIG. 4, step S402 as the image printing sequence (the process A) is a process for printing an image that a user sets as an image printing target (an image such as a natural image captured by the user, or an image generated by the user) in full color. In step S402 as the image printing sequence (the process A), the printer apparatus 20 prints an image with use of a similar method to conventional thermal transfer type printer apparatuses. In this way, in the process A, the thermal head 4 forms a full color image (the first image).

Next, the main controller 601 performs step S403 as the image printing sequence (the process B). Step S403 as the image printing sequence (the process B) includes a sequence for forming the engraved image M by embossing processing without using full color inks. An image $P_2$ illustrated at the right side of the flowchart of FIG. 4 indicates an example of the image (the second image) printed in step S403 as the image printing sequence (the process B). The image printed in step S403 as the image printing sequence (the process B) is a character or a decorative frame different from the image printed in step S402 as the image printing sequence (the process A), and step S403 as the image printing sequence (the process B) is processing for forming such an image. For convenience of the description, the term "drawing region $A_2$" will be used to indicate a region of a character, a decorative frame, and others as the second image printed (engraved) in step S403 as the image printing sequence (the process B). Further, the term "drawing peripheral region $A_1$" will be used to indicate a region surrounding the "drawing region $A_2$". For example, in a case where a character is engraved, the engraved character itself corresponds to the "drawing region $A_2$", and another region than the character corresponds to the "drawing peripheral region $A_1$".

The main controller 601 performs step S404 as the sheet discharge sequence after completing step S402 as the image printing sequence (the process A) and step S403 as the image printing sequence (the process B). In step S404 as the sheet discharge sequence, the main controller 601 controls the recording sheet conveyance motor driver 607 to drive the driving motor 614. As a result, the image printed product is discharged to the outside of the main body portion 100 of the printer apparatus 20 by the sheet discharge roller pair 9.

Upon completion of the above-described sequences, the printing operation is completed.

An image $P_3$ illustrated at the right side of the flowchart of FIG. 4 indicates an example of the printed final image. As illustrated in FIG. 4, the full color image $P_1$ as the first image is formed in the image printed product, and at the same time, the engraved image M as the second image is formed in the image printed product. In this way, by undergoing the above-described sequences, it is possible to acquire an image printed product in which a natural image or another image is printed, and at the same time, a character or a decorative frame is engraved. During the process A, the thermal head 4 forms a full color image by transferring inks on the recording sheet P. After that, during the process B, the thermal head 4 embosses the recording sheet P with the full color image formed thereon to generate concavity and convexity on the recording sheet P, thereby generating the engraved image M.

Next, a mechanical operation of the printer apparatus 20 during the printing processing will be described with reference to FIGS. 1 and 5 to 7.

FIG. 1 illustrates a sheet feeding operation of the main body portion 100 of the printer apparatus 20. This operation is an operation corresponding to step S401 as the sheet feeding sequence illustrated in FIG. 4. When a user presses the printing start button 11, as illustrated in FIG. 1, the sheet feeding roller 2 and the separation unit 3 separate and feed the uppermost one of the recording sheets P stacked on the recording sheet cassette 1, and convey it to between the thermal head 4 and the platen roller 5. An arrow illustrated in FIG. 1 indicates a direction of a rotation of the sheet feeding roller 2.

Figure 5:
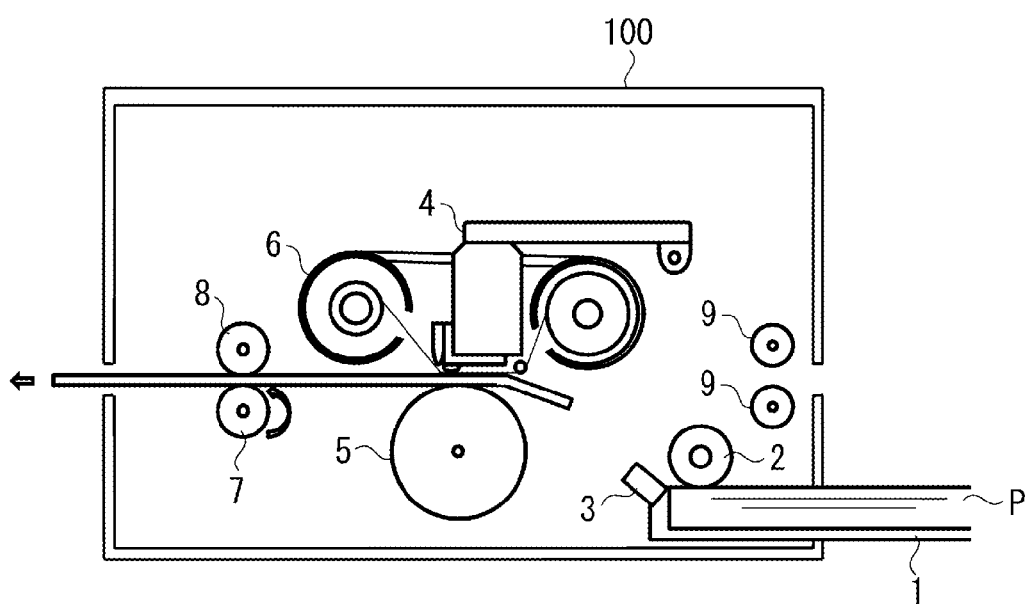
FIG. 5 illustrates an operation in processing of step S402 as an image printing sequence (a process A) and step S403 as an image printing sequence (a process B).
Figure 6:
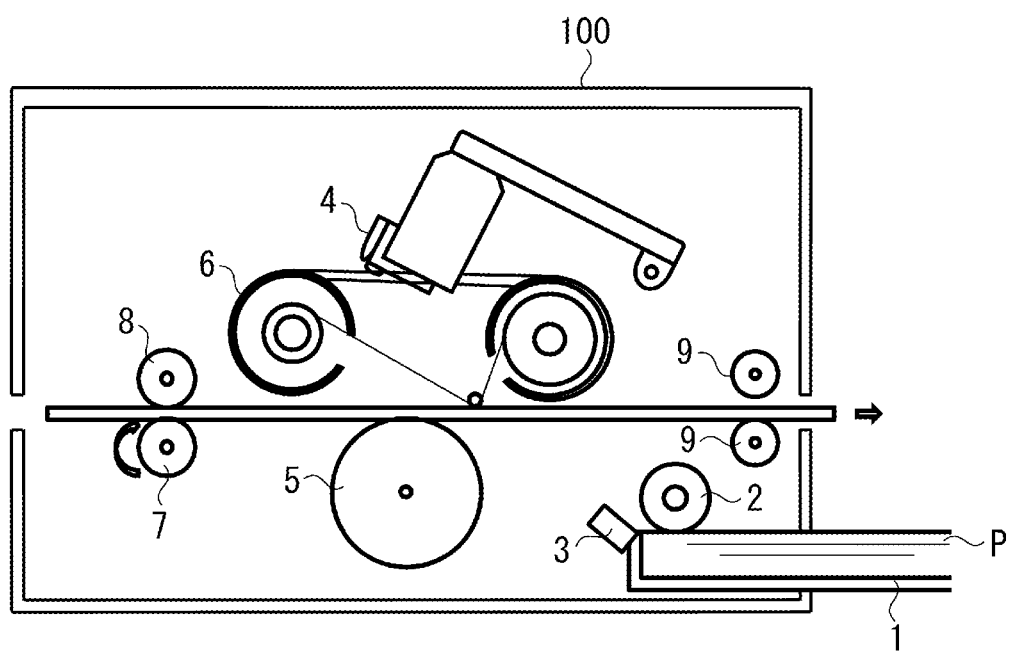
FIG. 6 illustrates an operation in the processing of step S402 as the image printing sequence (the process A) and step S403 as the image printing sequence (the process B).

FIGS. 5 and 6 schematically illustrate image printing operations of the printer apparatus 20. These operations are operations in step S402 as the image printing sequence (the process A) and step S403 as the image printing sequence (the process B) illustrated in FIG. 4.

FIG. 5 illustrates an operation of performing image printing (thermally transferring a transfer material to the recording sheet P) with use of any one of a plurality of kinds of transfer materials (for example, an yellow ink material, a magenta ink material, a cyan ink material, and an overcoat material) disposed on the ink sheet 6. As illustrated in FIG. 5, the thermal head 4 and the platen roller 5 sandwich the ink sheet 6 and the recording sheet P at the predetermined pressure. Then, the grip roller 7 and the pinch roller 8, which are disposed at a downstream side in the image printing direction, convey the recording sheet P. Then, the thermal head 4 thermally transfers the transfer material on the surface of the ink sheet 6 to the surface of the recording sheet P by heat thereof. Arrows illustrated in FIG. 5 indicate a direction of a rotation of the grip roller 7 and a direction of conveyance of the recording sheet P (the image printing direction).

FIG. 6 illustrates an operation of preparing for image printing of a next transfer material after completion of image printing with use of the any one of the plurality of kinds of transfer materials disposed on the ink sheet 6. Arrows illustrated in FIG. 6 indicate a direction of a rotation of the grip roller 7, and a direction of conveyance of the recording sheet P. As illustrated in FIG. 6, the thermal head 4 is separated from the platen roller 5, and the grip roller 7 and the pinch roller 8 rotate in a reverse direction of the direction during the image printing operation. As a result, the recording sheet P is conveyed to the image printing start position.

Then, the printer apparatus 20 also repeats the operations illustrated in FIGS. 5 and 6 for the next transfer material and the transfer materials subsequent thereto, thereby performing image printing. In this way, the printer apparatus 20 thermally transfers the transfer materials of three colors, namely, yellow, magenta, and cyan (inks for full color image printing) while superimposing them, thereby performing full color image printing. Further, the printer apparatus 20 thermally transfers the overcoat material to a surface of the image printed product that is printed in full color, thereby forming an overcoat layer.

Figure 7:
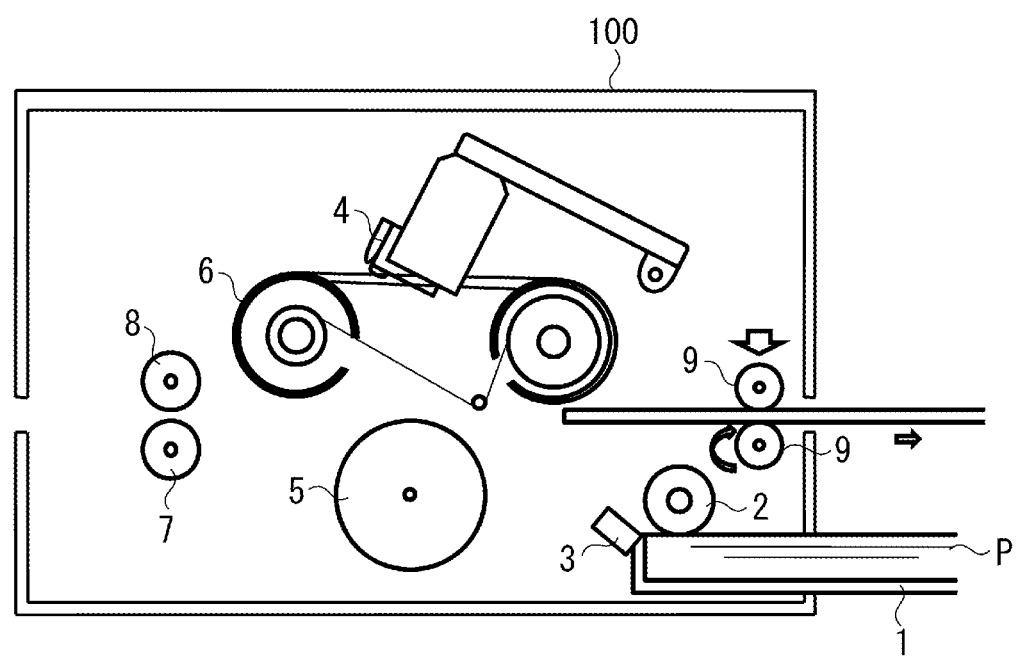
FIG. 7 schematically illustrates a sheet discharge operation of the printer apparatus.

FIG. 7 schematically illustrates a sheet discharge operation of the printer apparatus 20. This operation is an operation corresponding to step S404 as the sheet discharge sequence illustrated in FIG. 4. After completion of image printing, the main controller 601 controls the recording sheet conveyance motor driver 607 to drive the driving motor 614. As a result, the sheet discharge roller pair 9 conveys the image printed product while sandwiching it therebetween, and discharges the image printed product from a sheet discharge port to the outside of the main body portion 100 of the printer apparatus 20.

Next, a method for forming the engraved image M will be described in detail for each exemplary embodiment. The first and second exemplary embodiments are configured in such a manner that a full color image (the first image) is formed in step S402 as the image printing sequence (the process A), and an overcoat layer and the engraved image M (the second image) are formed in step S403 as the image printing sequence (the process B). In other words, in the first and second exemplary embodiments of the present invention, the printer apparatus 20 forms an overcoat layer and the engraved image M (the second image) in the process B simultaneously. On the other hand, a third exemplary embodiment is configured in such a manner that a full color image (the first image) and an overcoat layer are formed in step S402 as the image printing sequence (the process A), and the engraved image M (the second image) is formed in step S403 as the image printing sequence (the process B).

Step S402 as the image printing sequence (the process A) and step S403 as the image printing sequence (the process B) are stored in the ROM 605, which corresponds to the storage unit, as a computer program (computer software). The main controller 601 of the printer apparatus 20 reads out this computer program from the ROM 605 to execute it. As a result, step S402 as the image printing sequence (the process A) and step S403 as the image printing sequence (the process B) are performed.

The image printing processing of the process B according to the first exemplary embodiment will be described with reference to FIGS. 2 and 8 to 10.

The printer apparatus 20 has two types of image printing modes that allow switching how light is reflected on a surface of an image printed product. The image printing modes are switched according to a user's selection of an image printing mode. Then, the printer apparatus 20 switches how light is reflected on a surface of an image printed product by changing a surface characteristic of an overcoat layer. More specifically, the printer apparatus 20 has two glossy modes of a "high glossy mode", which forms a high glossy image printed product, and a "matte mode", which forms a matte and low glossy image printed product, as two types of modes for printing an overcoat. A control program for selecting the "high glossy mode" and the "matte mode", and a setting for use in execution of image printing in each image printing mode are stored in the ROM 605. Then, before the printer apparatus 20 prints an overcoat layer (normally, before the printing start button 11 is pressed), a user selects whether image printing is performed in the "high glossy mode" or the "matte mode". Then, the printer apparatus 20 sets the image printing mode according to the user's selection (operation).

A configuration that allows selection of the image printing mode will be described now. As illustrated in FIG. 2, the printer apparatus 20 includes the operation unit 10 as a user interface. Then, the operation unit 10 includes the image printing mode switching buttons 13 including a "high glossy mode button" and a "matte mode button". When a user presses any one of them, the main controller 601 sets the image printing mode according to the pressed switching button.

The user interface is not limited to the above-described configuration, and may be realized by another configuration. For example, the user interface may be configured in such a manner that the printer apparatus 20 includes a liquid crystal display device equipped with a touch panel. In this case, the display control unit 609 displays a menu for selecting the "high glossy mode" and the "matte mode" on the liquid crystal display device, and the main controller 601 switches the image printing mode to the mode corresponding to the menu item touched by a user.

Figure 8:
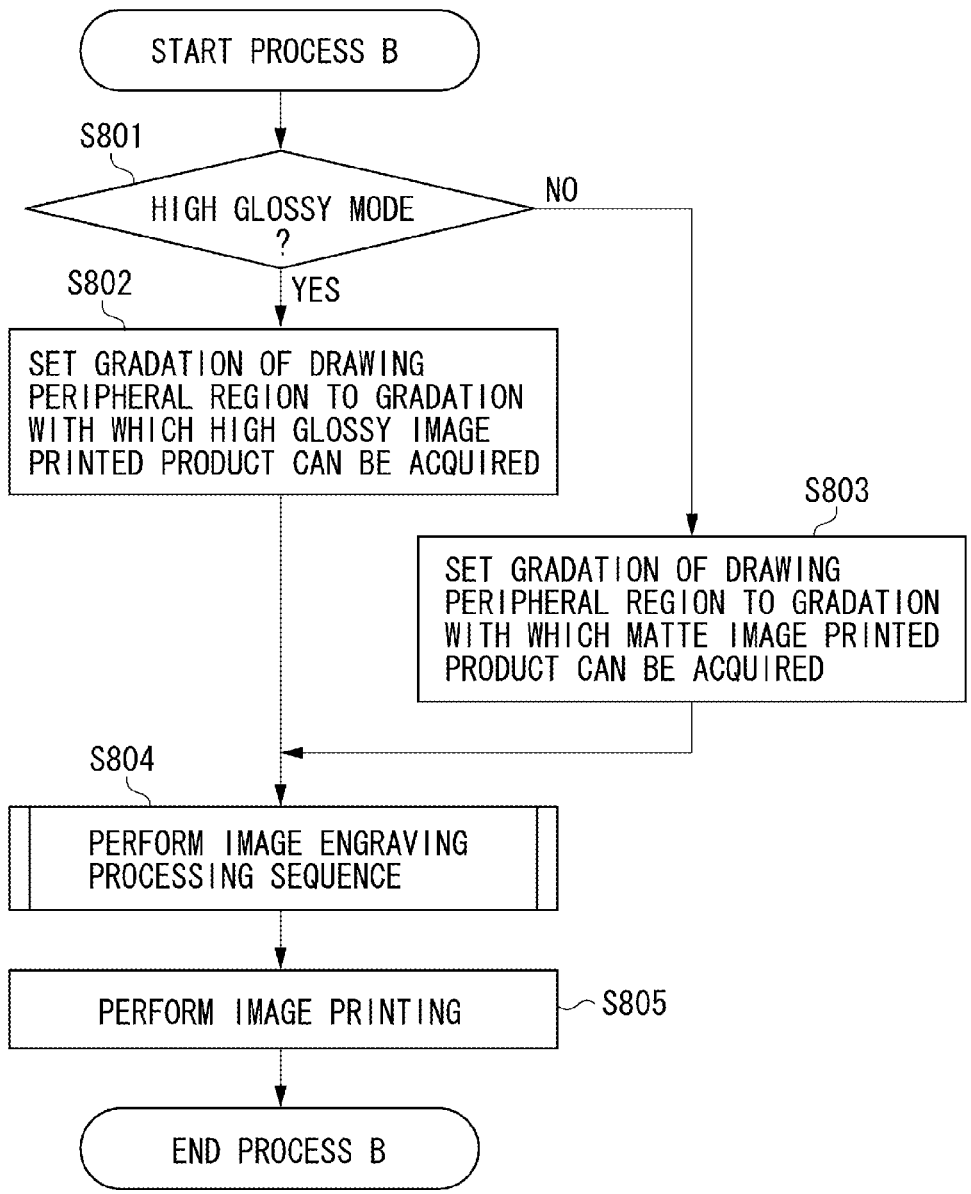
FIG. 8 is a flowchart illustrating the processing of step S403 as the image printing sequence (the process B).

The details of step S403 as the image printing sequence (the process B) will be described below. FIG. 8 is a flowchart illustrating the processing of step S403 as the image printing sequence (the process B).

In step S801, the main controller 601 determines which image printing mode a user selects based on an operation that the user performs on the operation unit 10 (based on which image printing mode switching button 13 is pressed). The present example will be described based on processing in which the main controller 601 determines which image printing mode is selected by determining whether the "high glossy mode" is selected.

In steps S802, S803, and S804, the main controller 601 functions as the image processing unit, and generates image printing data using image data.

If the high glossy mode is selected in step S801 (YES in step S801), the main controller 601 advances the processing to step S802. In step S802, the main controller 601 as the image processing unit generates image printing data in which the gradation of the drawing peripheral region $A_1$ of image data is changed into a gradation with which a high glossy image printed product can be acquired.

On the other hand, if the matte mode is selected in step S801 (NO in step S801), the main controller 601 advances the processing to step S803. In step S803, the main controller 601 as the image processing unit generates image printing data in which the gradation of the drawing peripheral region $A_1$ of image data is changed into a gradation with which a matte image printed product can be acquired.

In this way, the main controller 601 uses image data, and generates image printing data having the gradation of the drawing peripheral region $A_1$ according to the selected image printing mode.

The gradation of the drawing peripheral region $A_1$ set in the high glossy mode and the gradation of the drawing peripheral region $A_1$ set in the matte mode have the following relationship.

(the gradation of the drawing peripheral region $A_1$ set in the high glossy mode)<(the gradation of the drawing peripheral region $A_1$ set in the matte mode)

The gradation of the drawing peripheral region $A_1$ of image printing data set in the high glossy mode is a gradation that realizes an image printing condition capable of making a surface of an overcoat layer flat and smooth. When the printer apparatus 20 performs image printing with a gradation that satisfies such a condition, a high glossy image printed product can be acquired. For example, in the high glossy mode, the main controller 601 sets gradation level [160] among 8-bit gradation levels ([0] to [255]) as the gradation of the drawing peripheral region $A_1$.

On the other hand, in the matte mode, the printer apparatus 20 performs image printing, setting the gradation of the drawing peripheral region $A_1$ of image printing data to a higher value than the gradation in the high glossy mode. According to this configuration, higher heat energy is applied to the ink sheet 6 during image printing, compared to the high glossy mode. Therefore, the surface of the overcoat layer is roughened, whereby it is possible to acquire a matte image printed product having low glossiness. For example, when the matte mode is selected, the main controller 601 sets gradation level [245] among the 8-bit gradation levels as the gradation of the drawing peripheral region $A_1$ of image printing data.

In this way, the printer apparatus 20 performs image printing, setting different values for the gradation of the drawing peripheral region $A_1$, whereby it is possible to switch the two image printing modes, i.e., the high glossy mode and the matte mode.

In this way, the main controller 601 starts step S804 as an image engraving processing sequence after setting the gradation of the drawing peripheral region $A_1$ in each image printing mode.

Figure 9:
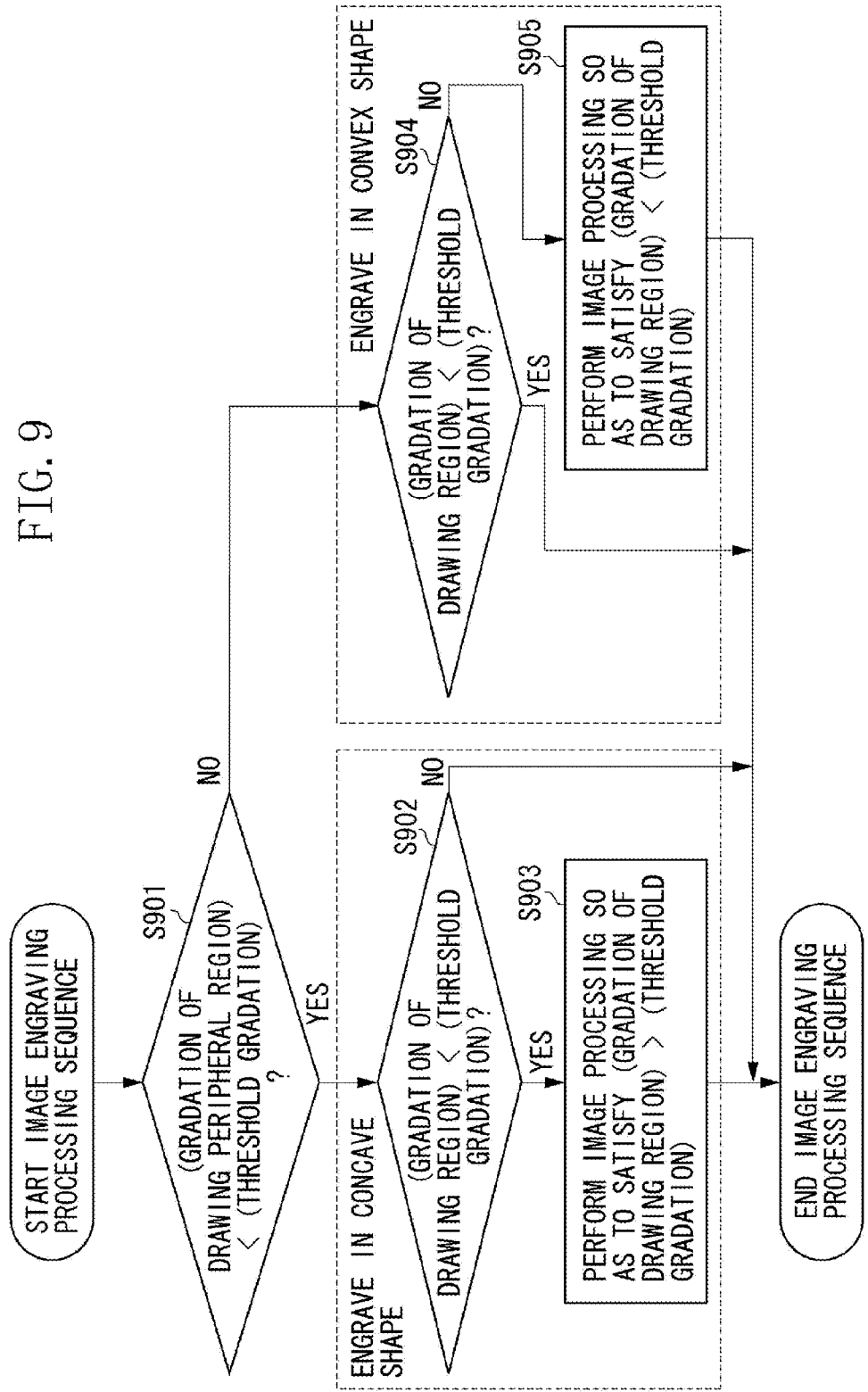
FIG. 9 is a flowchart illustrating the details of processing of step S804 as an image engraving processing sequence.

Step S804 as the image engraving processing sequence will be described with reference to FIG. 9. FIG. 9 is a flowchart illustrating the details of processing of step S804 as the image engraving processing sequence.

As described above, after the image printing mode is selected, the main controller 601 sets the gradation of the drawing peripheral region $A_1$ of the image printing data according to the set image printing mode. Then, the main controller 601 performs step S901 based on the set gradation. In step S901, the main controller 601 compares the gradation of the drawing peripheral region $A_1$ with a threshold gradation $L_c$. The threshold gradation $L_c$ is a gradation that corresponds to a border between whether the surface of the recording sheet P is thermally deformed. In other words, when the thermal head 4 is driven with a gradation equal to or higher than the threshold gradation $L_c$, the surface of the recording sheet P is thermally deformed.

Figure 10:
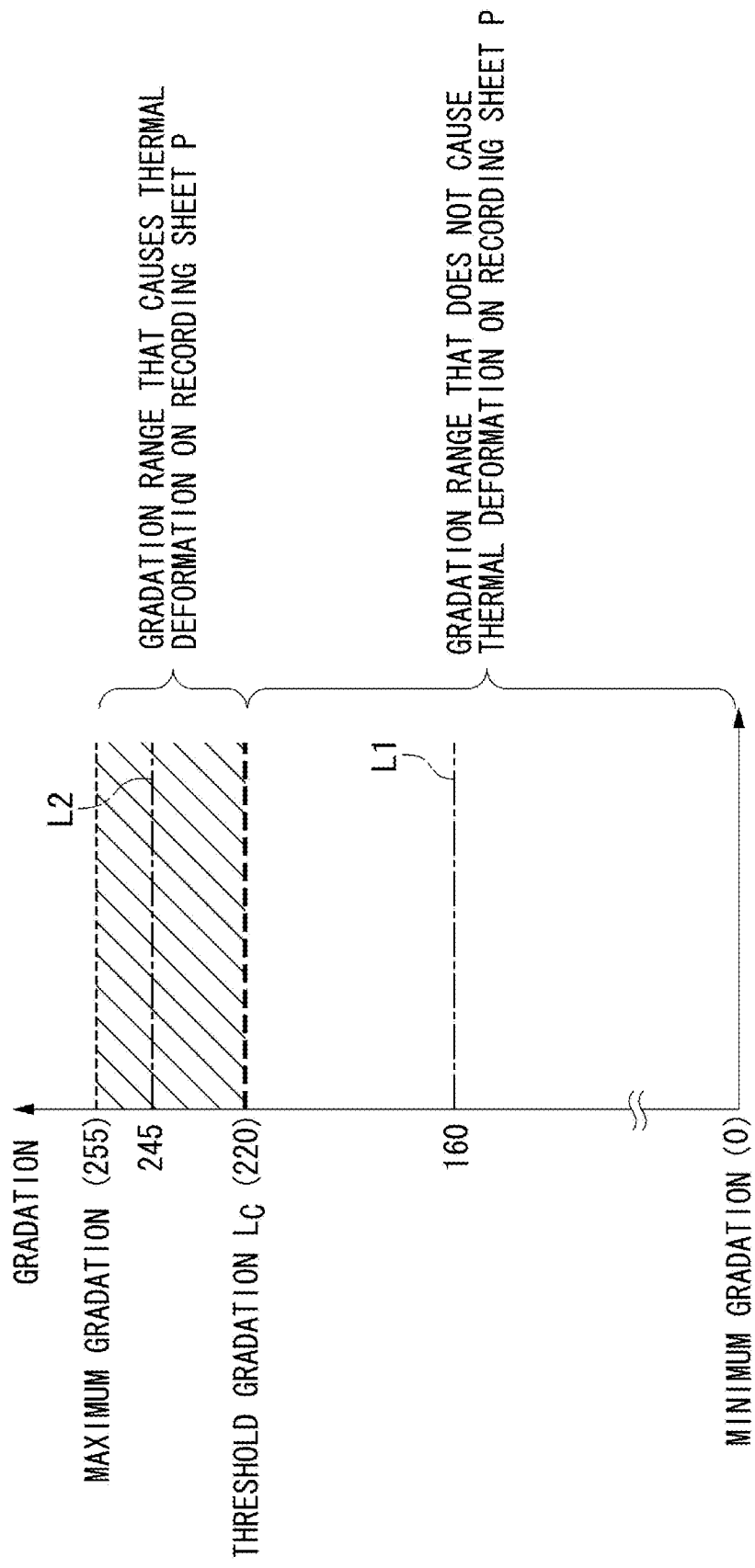
FIG. 10 schematically illustrates a relationship among a gradation $L_1$ of a high glossy mode, a threshold gradation $L_c$, and a gradation $L_2$ of a matte mode.

FIG. 10 schematically illustrates a relationship among a gradation $L_1$ of the high glossy mode, the threshold gradation $L_c$, and a gradation of $L_2$ of the matte mode. As illustrated in FIG. 10, the gradation $L_1$ of the high glossy mode, the threshold gradation $L_c$, and the gradation $L_2$ of the matte mode have the following relationship among them. (the gradation $L_1$ of the high glossy mode)<(the threshold gradation $L_c$)<(the gradation of $L_2$ of the matte mode)

For example, in a case where the threshold gradation $L_c$ is set to gradation level [220] among the 8-bit gradation levels, the gradation $L_1$ of the high glossy mode is set to gradation level [160], and the gradation of $L_2$ of the matte mode is set to gradation level [245].

Therefore, as illustrated in FIG. 10, in a case where image printing is performed in the high glossy mode, thermal deformation does not occur on the drawing peripheral region $A_1$ on the surface of the recording sheet P. In a case where image printing is performed in the matte mode, thermal deformation occurs on the drawing peripheral region $A_1$ on the surface of the recording sheet P.

If the gradation of the drawing peripheral region $A_1$ satisfies "(the gradation of the drawing peripheral region $A_1$)<(the threshold gradation $L_c$)" in step S901 (YES in step S901, i.e., if the image printing mode is the high glossy mode), the main controller 601 advances the processing to step S902. If the gradation of the drawing peripheral region $A_1$ satisfies "(the gradation of the drawing peripheral region $A_1$)<(the threshold gradation $L_c$)" (YES in step S901), thermal deformation does not occur on the drawing peripheral region $A_1$ of the recording sheet P. Therefore, to engrave the drawing region $A_2$, the step S902 and the step thereafter are a sequence for generating image printing data to cause thermal deformation on the drawing region $A_2$ of the recording sheet P.

In step S902, the main controller 601 compares the gradation of the drawing region $A_2$ with the threshold gradation $L_c$. If the gradation of the drawing region $A_2$ satisfies "(the gradation of the drawing region $A_2$)<(the threshold gradation $L_c$)" in step S902 (Yes in step S902), execution of image printing with this gradation does not cause thermal deformation on both the drawing region $A_2$ and the drawing peripheral region $A_1$. Therefore, concavity and convexity are not formed on the surface of the recording sheet P, leading to no formation of the engraved image M. Therefore, in step S903, which is the next step, the main controller 601 changes the gradation of the drawing region $A_2$ of the image printing data so as to satisfy "(the gradation of the drawing region $A_2$)>(the threshold gradation $L_c$)". In other words, the main controller 601 generates image printing data allowing the engraved image M to be formed (allowing the engraving processing to be performed). On the other hand, if the main controller 601 determines in step S902 that the gradation of the drawing region $A_2$ does not satisfy "(the gradation of the drawing region $A_2$)<(the threshold gradation $L_c$)" (NO in step S902), execution of image printing with this gradation can result in formation of the engraved image M. In other words, the printer apparatus 20 can form the engraved image M with use of the image printing data generated in step S802 without any adjustment made thereto.

If the main controller 601 determines in step S901 that the drawing peripheral region $A_1$ does not satisfy "(the gradation of the drawing peripheral region $A_1$)<(the threshold gradation $L_c$)" (NO in step S901, i.e., if the image printing mode is the matte mode), the main controller 601 advances the processing to step S904. If the drawing peripheral region $A_1$ does not satisfy "(the gradation of the drawing peripheral region $A_1$)< (the threshold gradation $L_c$)" (NO in step S901), thermal deformation occurs on the drawing peripheral region $A_1$ of the recording sheet P. Therefore, to engrave the drawing region $A_2$, step S904 and the steps thereafter are a sequence for generating image printing data that does not cause thermal deformation on the drawing region $A_2$ of the recording sheet P. According to this configuration, it is possible to generate image printing data that allows concavity and convexity to be formed on the surface of the recording sheet P. Therefore, execution of image printing with use of such image printing data results in formation of the engraved image M on the surface of the recording sheet P.

In step S904, the main controller 601 compares the gradation of the drawing region $A_2$ of the image printing data with the threshold gradation $L_c$. If the gradation of the drawing region $A_2$ does not satisfy "(the gradation of the drawing region $A_2$)<(the threshold gradation $L_c$) in step S904 (NO in step S904)", execution of image printing with this gradation will result in occurrence of thermal deformation on both the drawing region $A_2$ and the drawing peripheral region $A_1$. In this case, the engraved state of the drawing region $A_2$ becomes unclear. Therefore, in step S905, which is the next step, the main controller 601 changes the gradation of the drawing region $A_2$ in the image printing data so as to satisfy "(the gradation of the drawing region $A_2$)<(the threshold gradation $L_c$)". In other words, in step S905, the main controller 601 performs image processing for generating image printing data having a gradation allowing the engraved image M to be formed.

On the other hand, if the gradation of the drawing region $A_2$ satisfies "(the gradation of the drawing region $A_2$)<(the threshold gradation $L_c$)" in step S904 (YES in step S904), the engraved image M can be formed even by using the image printing data generated in step S802 without any adjustment made thereto. In other words, in this case, thermal deformation occurs on the drawing peripheral region $A_1$, but thermal deformation does not occur on the drawing region $A_2$. Therefore, concavity and convexity are formed on the surface of the recording sheet P. Therefore, the main controller 601 sets the image printing data generated in step S802 as final image printing data.

In this way, in step S804 as the image engraving processing sequence, the main controller 601 generates image printing data in which the gradation of the drawing region $A_2$ is changed so as to satisfy either "(the gradation of the drawing region $A_2$)<(the threshold gradation $L_c$)<(the gradation of the drawing peripheral region $A_1$)" or "(the gradation of the drawing region $A_2$)>(the threshold gradation $L_c$)>(the gradation of the drawing peripheral region $A_1$)".

In other words, the main controller 601 generates image printing data in which one of the gradation of the drawing region $A_2$ and the gradation of the drawing peripheral region $A_1$ in the engraved image M is set higher than the threshold gradation $L_c$, and the other is set lower than the threshold gradation $L_c$.

This is the detailed description of step S804 as the image engraving processing sequence.

After that, the main controller 601 advances the processing to step S805 as the image printing sequence (refer to FIG. 8). In step S805 as the image printing sequence, the head driving circuit 613 performs image printing by driving the thermal head 4 with use of the image data generated in step S804 as the image engraving processing sequence. The thermal head 4 provides heat according to the gradation of the image printing data to the ink sheet 6 and the recording sheet P. In other words, the thermal head 4 forms concavity and convexity on the surface of the recording sheet P to form the engraved image M by setting the gradation of the drawing region $A_2$ and the gradation of the drawing peripheral region $A_1$ in the engraved image M in such a manner that one of them becomes higher than the threshold gradation $L_c$, and the other becomes lower than the threshold gradation $L_c$.

Referring to FIG. 9, if the main controller 601 determines in step S901 that the gradation of the drawing peripheral region $A_1$ satisfies "(the gradation of the drawing peripheral region $A_1$)<(the threshold gradation $L_c$)" (YES in step S901), thermal deformation does not occur on the drawing peripheral region $A_1$, but thermal deformation occurs on the drawing region $A_2$. On the other hand, if the main controller 601 determines in step S901 that the gradation of the drawing peripheral region $A_1$ does not satisfy this relationship (NO in step S901), thermal deformation occurs on the drawing peripheral region $A_1$, but thermal deformation does not occur on the drawing region $A_2$. In this way, the deformed states of the drawing peripheral region $A_1$ and the drawing region $A_2$ are reversed between a case where the main controller 601 determines satisfaction of "(the gradation of the drawing peripheral region $A_1$)<(the threshold gradation $L_c$)", and a case where the main controller does not determine this satisfaction. Therefore, if the main controller 601 determines satisfaction of "(the gradation of the drawing peripheral region $A_1$)<(the threshold gradation $L_c$)" in step S901 in FIG. 9 (YES in step S901) (the high glossy mode), the engraved image M is formed with the drawing region $A_2$ in a concave state. On the other hand, if the main controller 601 does not determine satisfaction of "(the gradation of the drawing peripheral region $A_1$)<(the threshold gradation $L_c$)" in step S901 (NO in step S901) (the matte mode), the engraved image M is formed with the drawing region $A_2$ in a convex state.

In this way, when printing an overcoat layer, the printer apparatus 20 forms the engraved image M at the same time. Then, the process B is ended.

The above-described first exemplary embodiment has been described as a configuration that has two types of image printing modes of the high glossy mode and the matte mode as a surface state of an image printed product of the drawing peripheral region $A_1$. However, the number of types of image printing modes is not limited to two.

Figure 11:
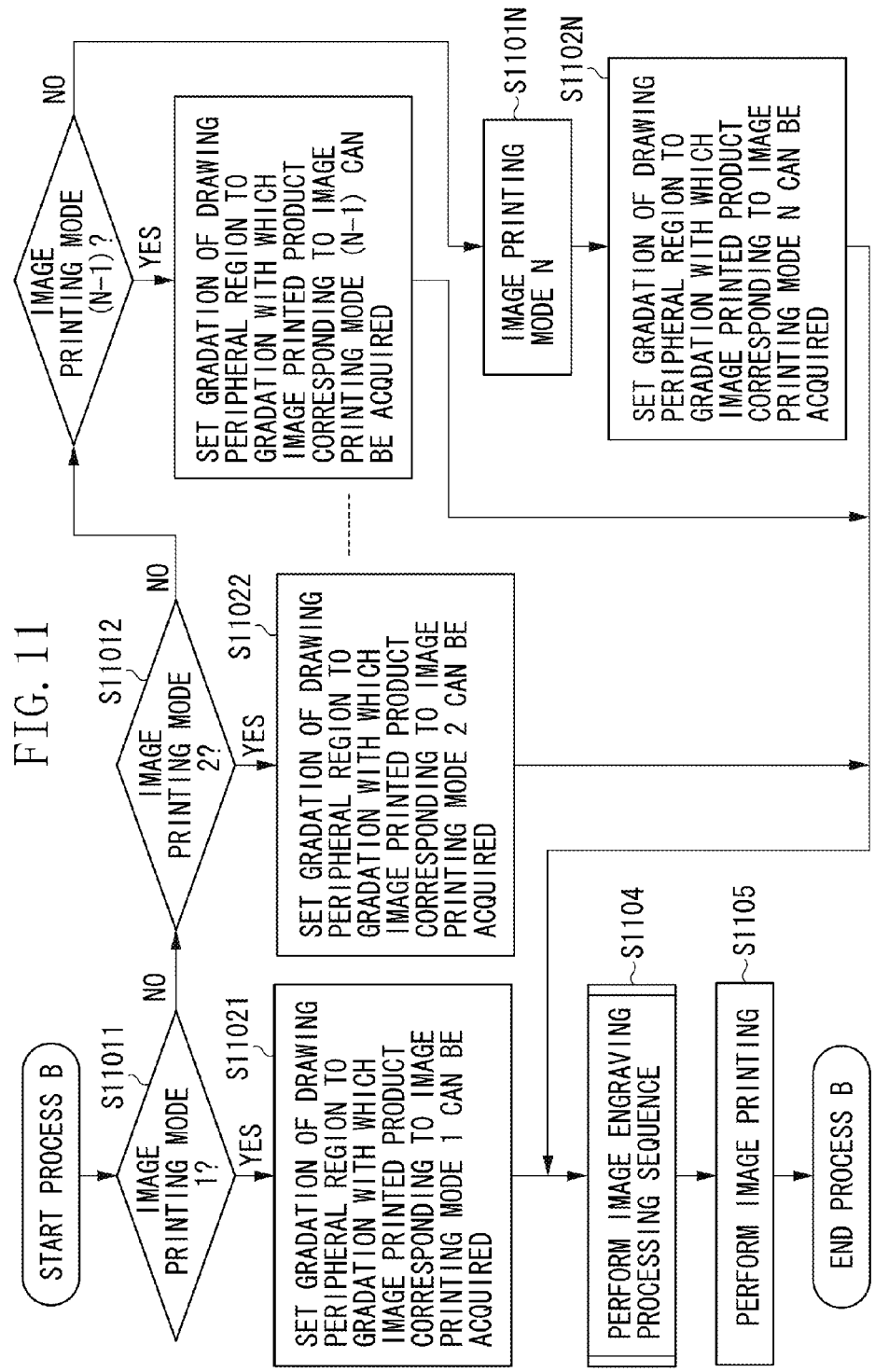
FIG. 11 is a flowchart illustrating the process B in a case where the printer apparatus has N types of image printing modes (an image printing mode 1 to an image printing mode N).

Therefore, the process B by the printer apparatus 20 having N types (N is 3 or a larger natural number) of image printing modes (in other words, a use can arbitrarily select a surface state of an image printed product from N types of image printing modes) will be described with reference to FIG. 11. FIG. 11 is a flowchart illustrating the process B by the printer apparatus 20 having N types of image printing modes (an image printing mode 1 to an image printing mode N).

In steps S11011 to S1101N, the main controller 601 determines which image printing mode is selected by a user (the image printing mode 1 to the image printing mode N). Then, in steps S11021 to S1102N, which are the next steps, the main controller 601 sets the gradation of the drawing peripheral region $A_1$ of image printing data according to the selected image printing mode. In respective steps S11021 to S1102N, the main controller 601 sets the gradation of the drawing peripheral region $A_1$ of image printing data to different values from one another. The gradations of the drawing peripheral region $A_1$ of image printing data are stored in, for example, the ROM 605. The main controller 601 reads out them to use them. Then, in step S1104, the main controller 601 generates image printing data from image data. The contents of the processing are similar to step S804. Next, in step S1105, the main controller 601 performs the image printing processing with use of the generated image printing data. According to this configuration, the printer apparatus 20 can switch a surface state of an image printed product to any of the N types of image printing modes according to a user's selection. Then, the printer apparatus 20 can form the engraved image M in each of the image printing modes. Therefore, it is possible to acquire the excellent engraved image M regardless of a surface state of an overcoat layer.

Figure 12:
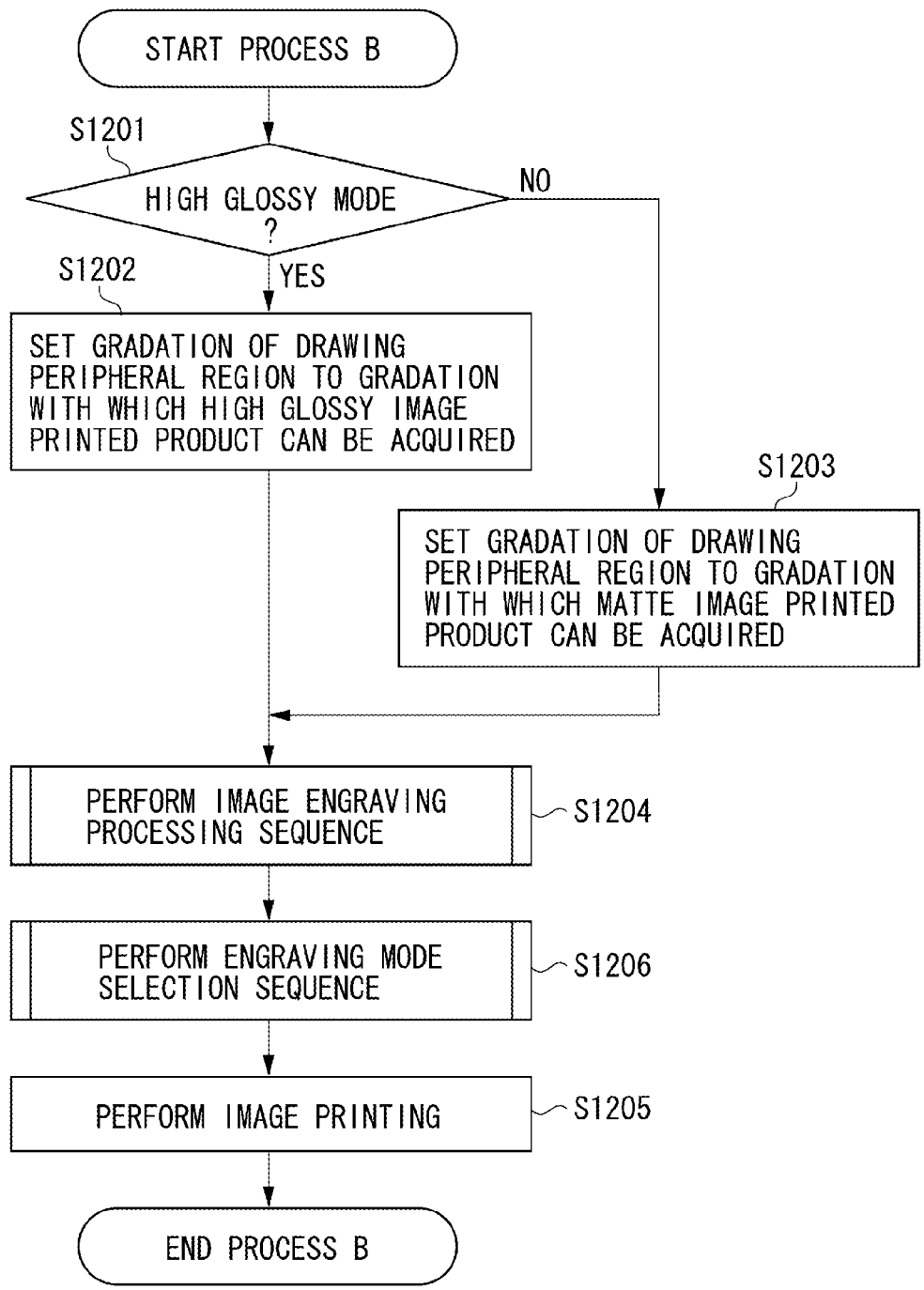
FIG. 12 is a flowchart illustrating the process B according to a second exemplary embodiment.

Next, the process B according to the second exemplary embodiment of the present invention will be described with reference to FIG. 12 and FIGS. 15A, 15B, 15C, and 15D. FIG. 12 is a flowchart illustrating the process B according to the second exemplary embodiment. As illustrated in FIG. 12, the second exemplary embodiment has the configuration of the first exemplary embodiment with step S1206 as an engraving mode selection sequence added thereto. The other steps are similar to the first exemplary embodiment (refer to FIG. 8). In other words, steps S1201 to S1205 are similar to steps S801 to S805, respectively. Therefore, in the following description, step S1206 as the engraving mode selection sequence will be described, and descriptions of the other steps, steps S1201 to S1205 will be omitted.

The printer apparatus 20 according to the second exemplary embodiment has two engraving modes, namely, a "clear engraving mode" and an "obscure engraving mode". The "clear engraving mode" is a mode for clearly engraving the engraved image M to detail. The "obscure engraving mode" is a mode for providing confidentiality to the engraved image M.

The engraving mode switching buttons 14 including a "clear engraving mode" button and an "obscure engraving mode" button are disposed at the operation unit 10 of the printer apparatus 20 (refer to FIG. 2). Then, when a user selects and presses one of the engraving mode switching buttons 14, the main controller 601 sets the engraving mode according to the pressed engraving mode switching button 14.

Then, in step S1206 as the engraving mode selection sequence, the main controller 601 uses image data generated in step S1204 as the image engraving processing sequence, and performs image processing according to the selected engraving mode.

Figure 13:
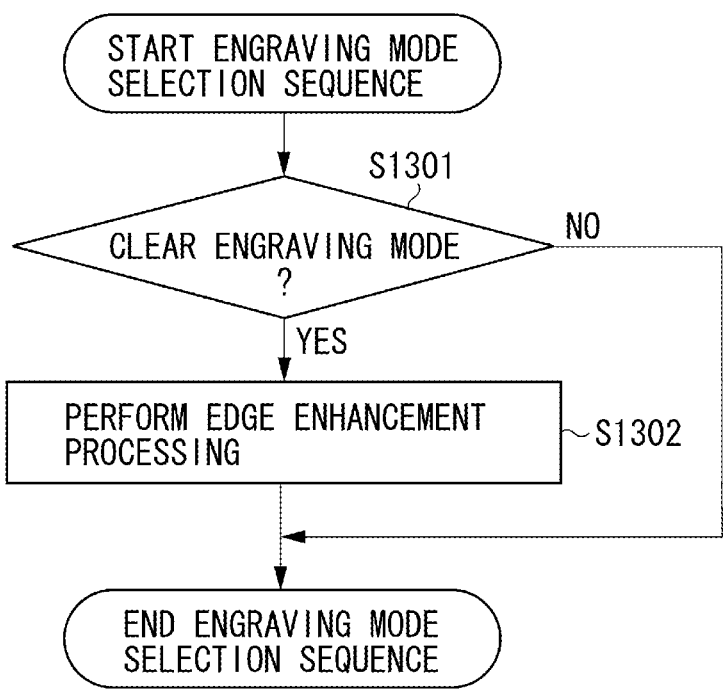
FIG. 13 is a flowchart illustrating the details of step S1206 as an engraving mode selection sequence.

Step S1206 as the engraving mode selection sequence will be described now with reference FIG. 13. FIG. 13 is a flowchart illustrating the details of step S1206 as the engraving mode selection sequence.

In step S1301, which is the first step, the main controller 601 determines which mode is selected, the "clear engraving mode" or the "obscure engraving mode". At this time, the main controller 601 determines which mode is selected by a user, by determining whether the "clear engraving mode" is selected.

If the main controller 601 determines in step S1301 that the selected mode is not the "clear engraving mode" (NO in step S1301), the main controller 601 determines that the "obscure engraving mode" is selected. Then, the processing proceeds to step S1205 as the image printing sequence, which is the next step (refer to FIG. 12). Then, in step S1205 as the image printing sequence, the driver controller 612 performs image printing with use of the image printing data generated by the main controller 601 in step S1204 as the image engraving processing sequence as final image printing data.

Figure 14A:
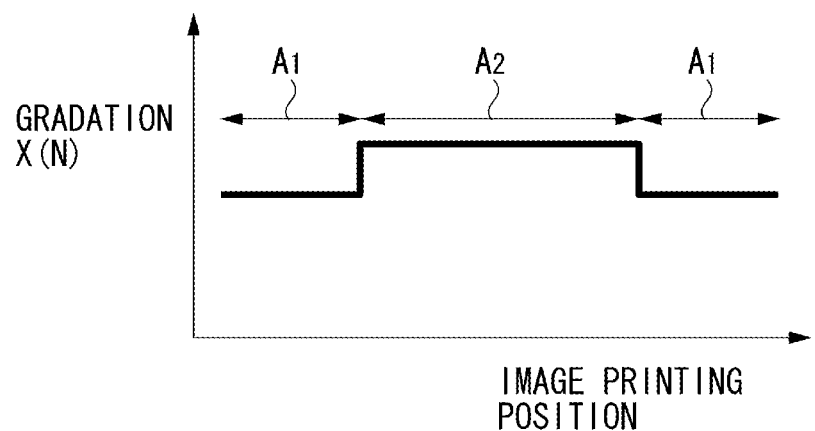
FIGS. 14A, 14B, 14C, and 14D each illustrate an example of forming an engraved image M in which a drawing region $A_2$ is concaved with the high glossy mode selected.
Figure 14B:
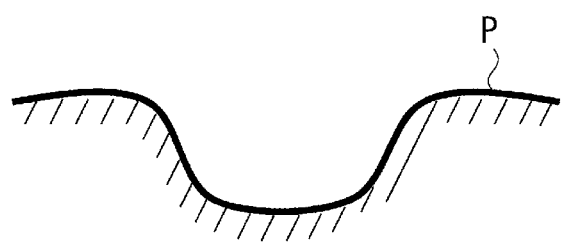

On the other hand, if the main controller 601 determines in step S1301 that the "clear engraving mode" is selected (YES in step S1301), the main controller 601 advances the processing to step S1302 as an edge enhancement processing sequence, which is the next step. In step S1302 as the edge enhancement processing sequence, the main controller 601 functions as the image processing unit, and performs edge enhancement processing on the image printing data. The content of step S1302 as the edge enhancement processing sequence will be described now. FIGS. 14A, 14B, 14C, and 14D and FIGS. 15A, 15B, 15C, and 15D schematically illustrate the content of step S1302 as the edge enhancement processing sequence. FIGS. 14A, 14B, 14C, and 14D illustrate an example in which the high glossy mode is selected, and the engraved image M is formed with the drawing region $A_2$ in a concave state. FIGS. 15A, 15B, 15C, and 15D illustrate an example in which the matte mode is selected, and the engraved image M is formed with the drawing region $A_2$ in a convex state. Then, FIGS. 14A and 15A each illustrate a gradation of image printing data for which the edge enhancement processing is not performed. FIGS. 14B and 15B each schematically illustrate a cross section of the recording sheet P of an image printed product engraved with use of the image printing data illustrated in FIGS. 14A and 15A. Further, FIGS. 14C and 15C each illustrate a gradation of image printing data for which the edge enhancement processing is performed. FIGS. 14D and 15D each schematically illustrate a cross section of the recording sheet P of an image printed product engraved with use of the image printing data illustrated in FIGS. 14C and 15C.

Figure 14C:
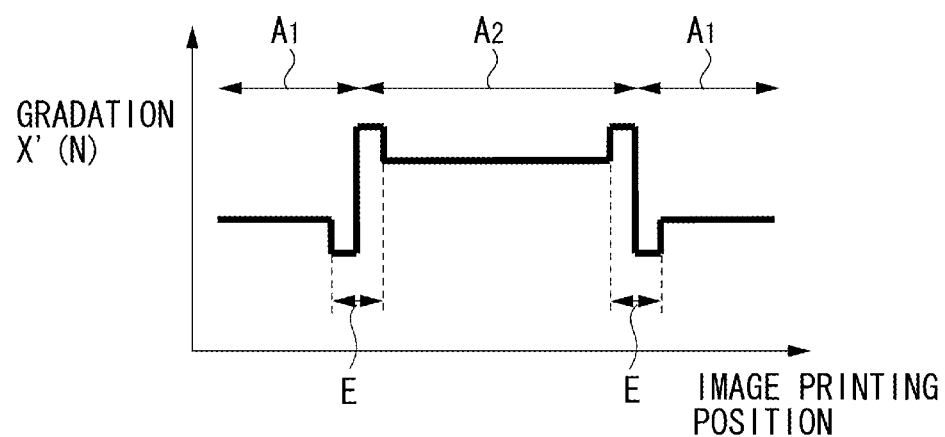
Figure 14D:
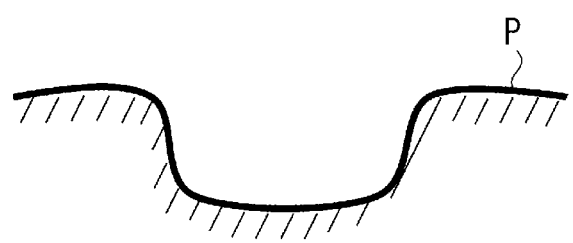
Figure 15A:
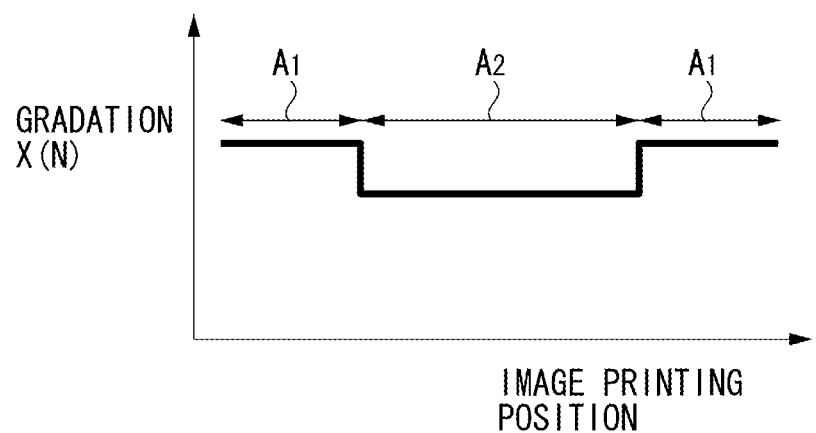
FIGS. 15A, 15B, 15C, and 15D each illustrate an example of forming the engraved image M in which the drawing region $A_2$ is convexed with the matte mode selected.
Figure 15B:
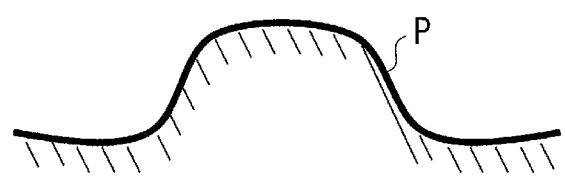
Figure 15C:
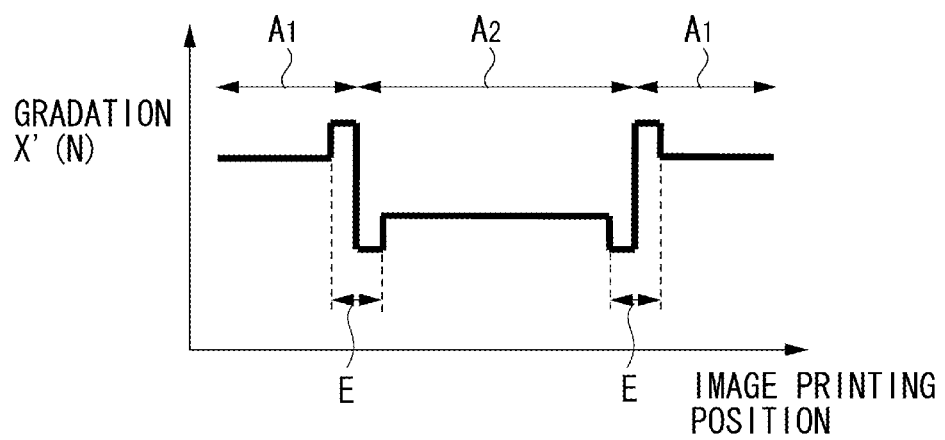
Figure 15D:
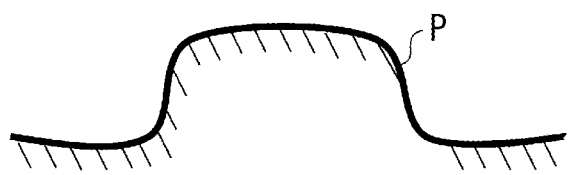

As illustrated in FIGS. 14C and 15C, the main controller 601 performs the edge enhancement processing on an edge portion E (i.e., a boundary portion between the drawing region $A_2$ and the drawing peripheral region $A_1$) of the drawing region $A_2$ in image printing data. This edge enhancement processing is processing for changing a gradation of the edge portion E of the drawing region $A_2$ in image printing data, and increasing a gradation change at the edge portion E compared to image printing data for which the edge enhancement processing is not performed.

More specifically, the main controller 601 determines a gradation X'(n) indicated in FIGS. 14C and 15C with use of the following equation (1):

$$X'(n)=X(n)+k\{X(n+1)-X(n-1)\} \quad (1)$$

In this equation, X(n), X(n+1), and X(n−1) represent gradations (corresponding to the gradations illustrated in FIGS. 14A and 15A) of the image printing data generated in step S1204 as the image engraving processing sequence. The variable "n" represents a target pixel number (corresponding to an image printing position in FIGS. 14A and 15A). In other words, X(n) represents a gradation of a pixel number n, and X(n+1) and X(n−1) represent gradations of pixels adjacent to the pixel number n. Further, "k" represents a coefficient. The coefficient k is appropriately set so as to be able to enhance an edge. The coefficient k is stored in the ROM 605 as the storage unit. The main controller 601 reads out the coefficient k from the ROM 605 to use it in the processing. Then, a difference between gradations of pixels adjacent to each other can be amplified by changing the luminance with use of the equation (1). Therefore, it is possible to emphasize the gradation change at the edge portion E of the drawing region $A_2$. When image printing is performed with use of image printing data on which the edge enhancement processing is performed, a change in a heat amount also increases at the edge portion E of the drawing region $A_2$. As a result, as illustrated in FIGS. 14D and 15D, the inclination angle becomes precipitous at the edge portion E of the engraved drawing region $A_2$. Therefore, in case where a user wants to form the engraved image M including a small character and image, the "clear engraving mode" is effective. Further, since the inclination angle is precipitous at the edge portion E of the drawing region $A_2$, the degree of scattering of light also increases here (in other words, the reflection state of light largely changes). Therefore, it becomes easy for a viewer to recognize engraved information. FIGS. 14A and 14B and FIGS. 15A and 15B correspond to an example in which the "obscure engraving mode" is selected.

The second exemplary embodiment performs processing for enhancing the edge portion E by the image processing as indicated by the equation (1). However, the second exemplary embodiment is not limited thereto. An important point is that the second exemplary embodiment can be realized by any configuration capable of controlling the change in the heat amount at the edge portion E of the drawing region $A_2$. For example, edge enhancement processing using the following equation (2) can also provide a similar effect to the above-described example.

$$X'(n)=X(n)+k\{2\times X(n+1)-X(n-1)\} \quad (2)$$

In this way, in step S1206 as the engraving mode selection sequence, the main controller 601 generates image printing data in which the gradation of the edge portion E of the drawing region $A_2$ of the engraved image M is set to a different gradation from the gradation of the drawing region $A_2$ and the gradation of the drawing peripheral region $A_1$. Then, in step S1205 as the image printing sequence, the head driving circuit 613 drives the thermal head 4 to perform image printing with use of the image printing data generated in step S1206 as the engraving mode selection sequence. The thermal head 4 provides heat according to the gradation of the image printing data to the ink sheet 6 and the recording sheet P. In other words, the thermal head 4 forms the engraved image M with use of a different gradation from the gradation of the drawing region $A_2$ and the gradation of the drawing peripheral region $A_1$ as the gradation of the edge portion E of the drawing region $A_2$.

Further, the second exemplary embodiment has been described as a configuration that has two types of modes, namely, the "clear engraving mode" and the "obscure engraving mode" as the engraving modes. However, the number of types of modes is not limited to two. For example, in the edge enhancement processing, the main controller 601 switches the change amount of the gradation of the edge portion E in multiple steps, thereby controlling the inclination angle of the edge portion E of the drawing region $A_2$ in multiple steps. As a result, it is possible to change the visibility of the engraved image M in multiple steps.

Figure 17:
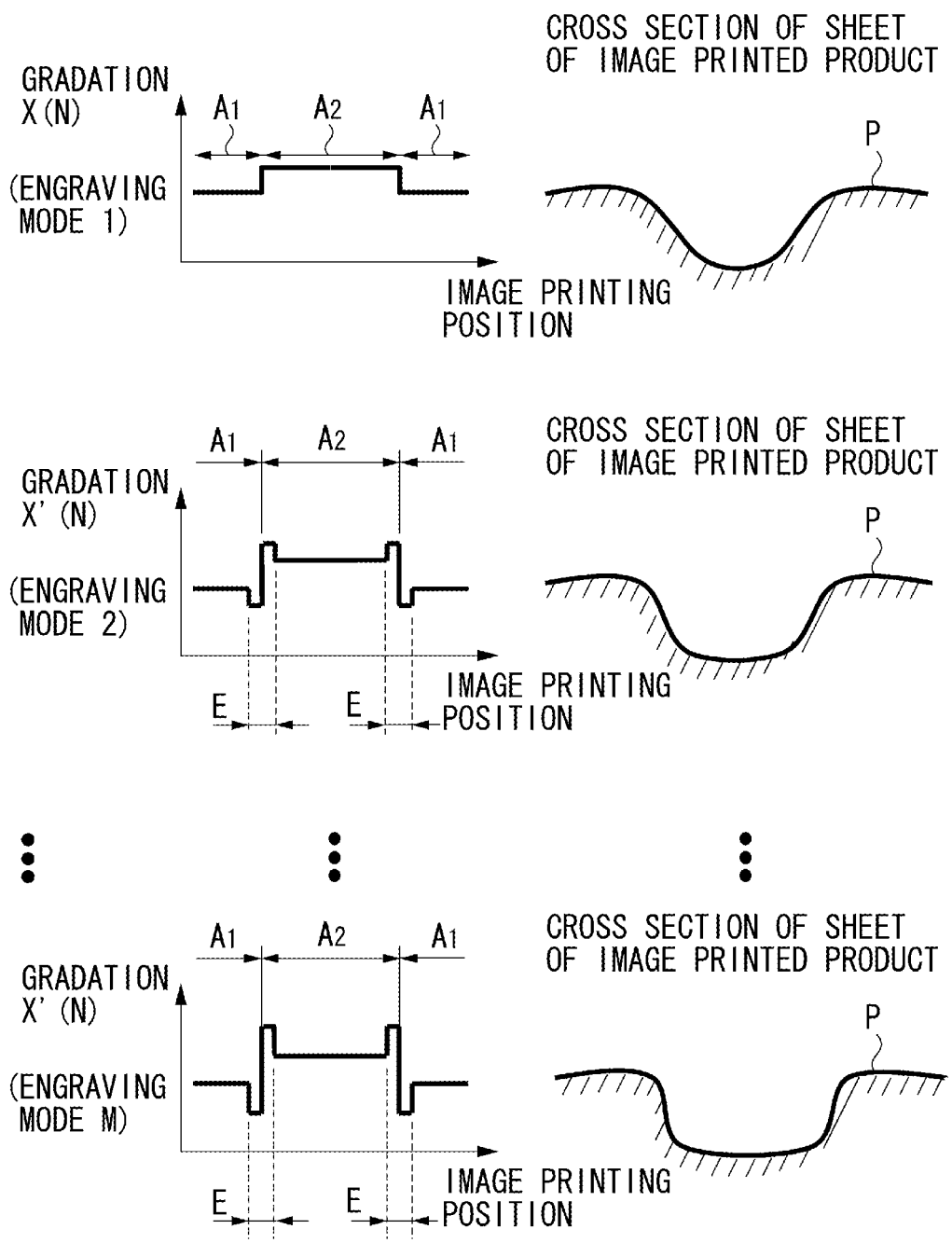
FIG. 17 schematically illustrates image printing data, and a cross section of an image printed product for each of the M types of engraving modes.

Now, the printer apparatus 20 having M types (M is 3 or a larger natural number) of engraving modes (an engraving mode 1 to an engraving mode M) will be briefly described. FIG. 16 is a flowchart illustrating the details of step S1206 as the engraving mode selection sequence by the printer apparatus 20 having M types of engraving modes. FIG. 17 schematically illustrates image printing data and a cross section of an image printed product in each of the M types of engraving modes.

In steps S16011 to S1601M, the main controller 601 determines which engraving mode (the engraving mode 1 to the engraving mode M) is selected by a user.

Then, in steps S16021 to S1602M, which are the next steps, the main controller 601 performs the edge enhancement processing on the image printing data according to the selected engraving mode.

In the edge enhancement processing at this time, for example, M kinds of coefficients k having values different from one another are used in the equation (1). These M kinds of coefficients k having values different from one another are stored in the ROM 605 as the storage unit. The main controller 601 reads out the coefficients from the ROM 605, and uses them to set the gradation of the edge portion E. As illustrated in FIG. 17, the printer apparatus 20 can have the M types of engraving modes by using the M kinds of coefficients k having values different from one another. Then, the inclination angle at the edge portion E of the drawing region $A_2$ varies according to the value of the coefficient k. For example, as the value of the coefficient k increases, the inclination angle at the edge portion E of the drawing region $A_2$ becomes more precipitous. FIG. 17 illustrates an example in which the coefficient k is the smallest in the engraving mode 1, the coefficient k sequentially increases as the number of the engraving mode (the number of 1 to M) increases, and the coefficient k is the largest in the engraving mode M.

Therefore, it is possible to change the visibility of the engraved image M in multiple steps according to the number of the coefficients k.

In this way, the plurality of coefficients k having values different from one another is stored in the ROM 605 as the storage unit. Then, the main controller 601 selects one of the plurality of coefficients k according to a user's selection of the engraving mode, and determines the gradation of the edge portion E of the drawing region $A_2$ with use of the selected coefficient k. According to the configuration that sets the gradation of the edge portion E of the drawing region $A_2$ with use of the equation (1) or (2), the set edge portion E of the drawing region $A_2$ has a gradation according to the value of the coefficient k.

Figure 18:
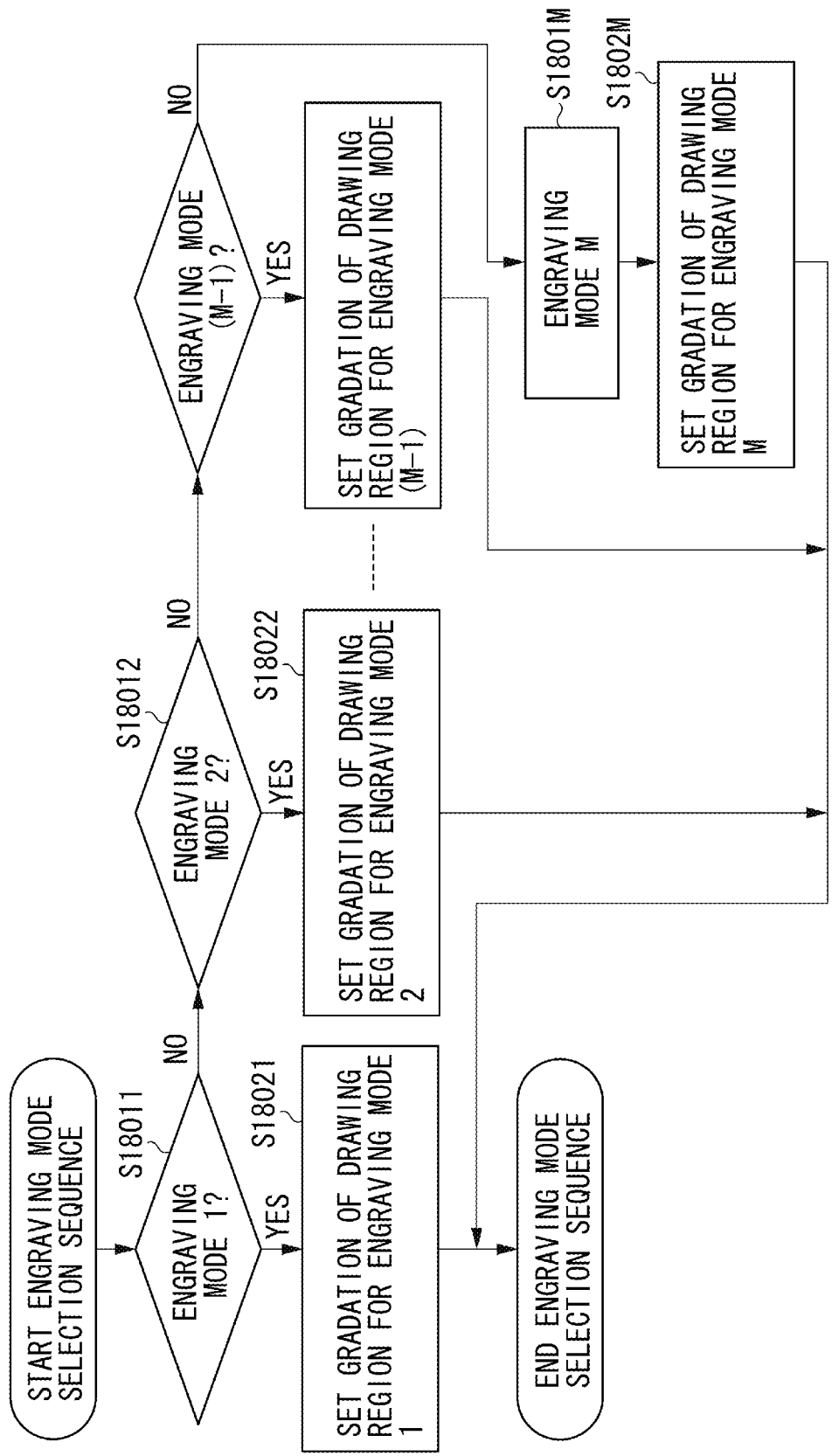
FIG. 18 is a flowchart illustrating the details of step S1206 as the engraving mode selection sequence in a case where the printer apparatus has M types of engraving modes (an engraving mode 1 to an engraving mode M).
Figure 19:
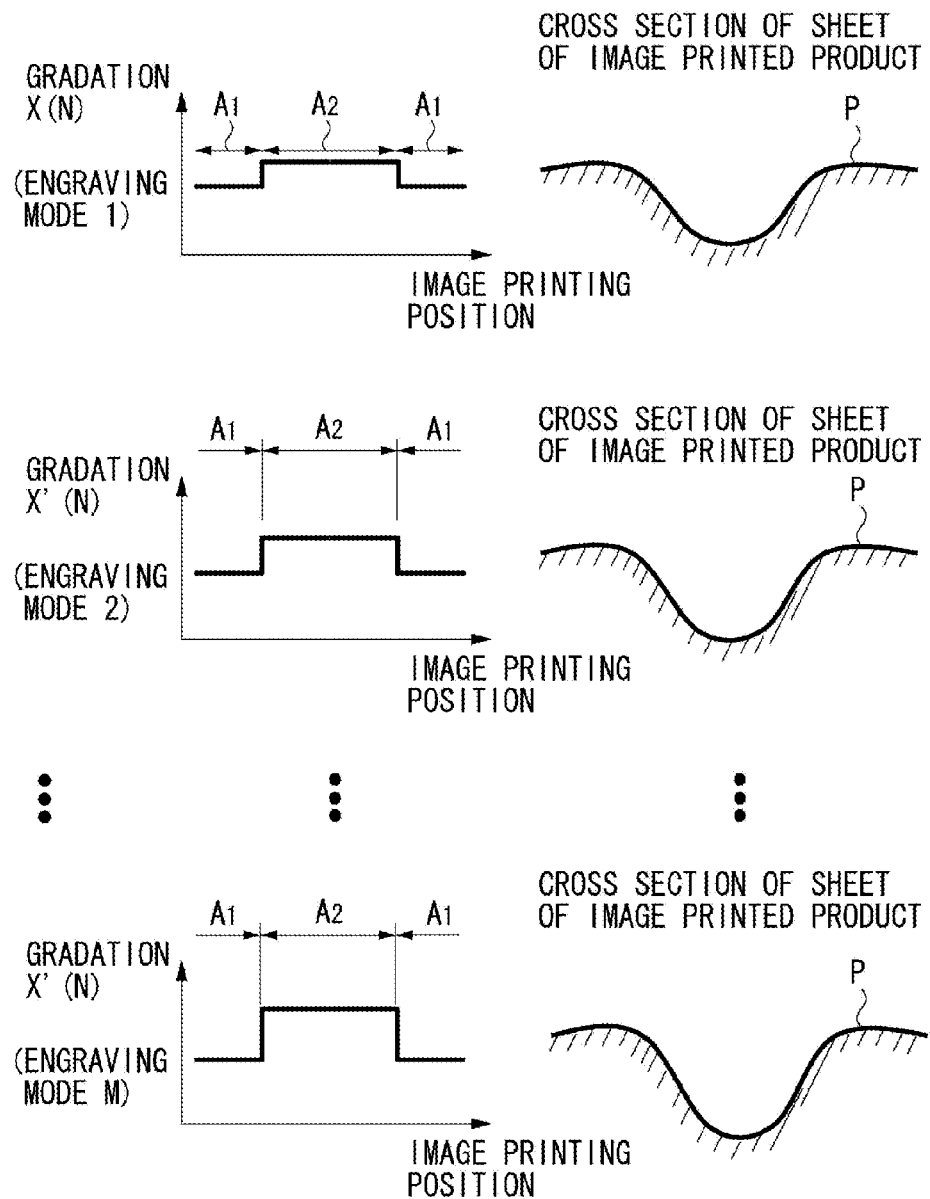
FIG. 19 schematically illustrates processing for performing printing using gradation settings set in steps S18021 to S1802M, and cross sections of a recording sheet P, which is an image printed product.

Further, to form the engraved image M in which the gradation of the drawing peripheral region $A_1$ is smaller than the threshold gradation L" especially like the high glossy mode, the following method can be employed. In step S1206 as the engraving mode selection sequence (refer to FIG. 12), the main controller 601 sets the gradation of the drawing region $A_2$ in multiple steps within a gradation range larger than the threshold gradation $L_c$. According to this configuration, it is possible to control a step difference in concavity or convexity in the engraved image M. FIG. 18 is a flowchart illustrating the details of step S1206 as the engraving mode selection sequence by the printer apparatus 20 having M types of engraving modes (the engraving mode 1 to the engraving mode M). In steps S18011 to S1801M, the main controller 601 determines which engraving mode (the engraving mode 1 to the engraving mode M) is selected by a user. In steps S18021 to S1802M, which are the next steps, the main controller 601 sets the gradation of the drawing region $A_2$ according to the selected engraving mode. FIG. 19 schematically illustrates processing for performing printing with use of the gradation settings set in steps S18021 to S1802M, and cross sections of the recording sheet P, which is an image printed product. As illustrated in FIG. 19, as the gradation of the drawing region $A_2$ increases, a step difference in concavity or convexity in the engraved image M also increases. Then, the degree of a step difference in concavity or convexity is determined according to a gradation difference between the drawing region $A_2$ and the drawing peripheral region $A_1$. FIG. 19 illustrates an example in which the gradation difference is the smallest in the engraving mode 1, the gradation difference sequentially increases as the number of the engraving mode (the number of 1 to M) increases, and the gradation difference is the largest in the engraving mode M. Then, the main controller 601 sets the gradation of the drawing region $A_2$ in multiple steps within a gradation range larger than the threshold gradation $L_c$, and, therefore, can set the gradation difference between the drawing region $A_2$ and the drawing peripheral region $A_1$ in multiple steps. Therefore, it becomes possible to change the visibility of the engraved image M in multiple steps in a similar manner to the edge enhancement processing.

On the other hand, forming the engraved image M in which the gradation of the drawing peripheral region $A_1$ is higher than the threshold gradation $L_c$, like the matter mode, requires an opposite setting from the above-described setting. More specifically, in step S1206 as the engraving mode selection sequence (refer to FIG. 12), the main controller 601 sets the gradation of the drawing region $A_2$ in multiple steps within a gradation range smaller than the threshold gradation $L_c$. According to this configuration, it is possible to change the visibility of the engraved image M in multiple steps in a similar manner to the above-described configuration.

As described above, according to the present exemplary embodiment of the present invention, it is possible to provide the printer apparatus 20 capable of forming the engraved image M having various types of visibility.

Next, a third exemplary embodiment of the present invention will be described. According to the third exemplary embodiment, the printer apparatus 20 (the main controller 601) prints yellow, magenta, cyan, and overcoat images in the process A, which is the processing of full color image printing. Then, the printer apparatus 20 performs the process B including the engraving processing after the process A.

Figure 20:
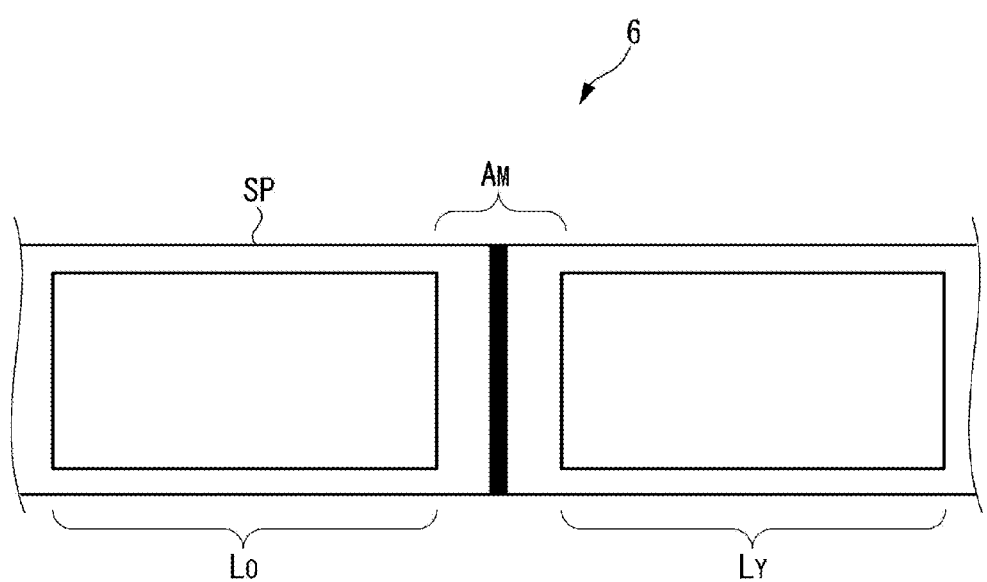
FIG. 20 schematically illustrates a structure of an ink sheet for use in a third exemplary embodiment.

FIG. 20 schematically illustrates a structure of the ink sheet 6 used in the third exemplary embodiment. The ink sheet 6 is formed in such a manner that ink surfaces of the respective colors (only a yellow ink surface $L_Y$ is illustrated in FIG. 20) and an overcoat surface $L_o$ are arranged on the surface of a base sheet $S_p$. The printer apparatus 20 performs engraving processing with use of a region (an engraving processing region) $A_M$ where there is no thermal transfer ink component from the overcoat surface $L_o$ to the next ink surface for yellow image printing (the yellow ink surface $L_Y$ in FIG. 20) illustrated in FIG. 20, after printing an overcoat layer.

The printer apparatus 20 (the main controller 601) performs image printing with use of the generated image printing data after performing step S804 as the image engraving processing sequence (refer to FIG. 8), in a similar manner to the first and second exemplary embodiments.

To form the engraved image M with the drawing region $A_2$ in a concave state, the main controller 601 generates image printing data that satisfies "(the gradation of the drawing peripheral region $A_1$)<(the threshold gradation $L_c$)<(the gradation of the drawing region $A_2$)" in step S804 as the image engraving processing sequence. On the other hand, to form the engraved image M with the drawing region $A_2$ in a convex state, the main controller 601 generates image printing data that satisfies "(the gradation of the drawing peripheral region $A_1$)>(the threshold gradation $L_c$)>(the gradation of the drawing region $A_2$)".

Figure 21:
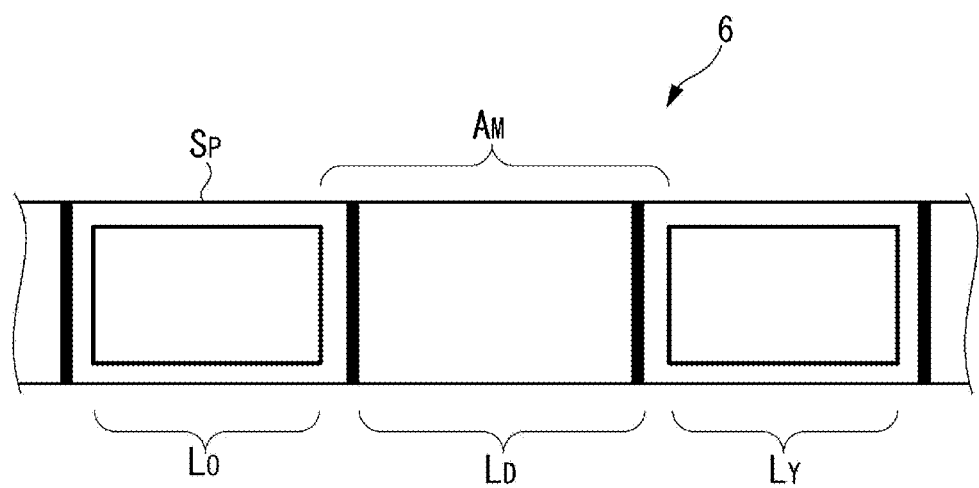
FIG. 21 schematically illustrates a structure of an ink sheet that can be used in the third exemplary embodiment.

As illustrated in FIG. 20, in a case where the ink sheet 6 is a commonly-used ink sheet, the area of the engraving processing region $A_M$ is small compared to the areas of the ink surface and the overcoat surface $L_o$. Therefore, the third exemplary embodiment can use the ink sheet 6 illustrated in FIG. 21. FIG. 21 schematically illustrates a structure of the ink sheet 6 that can be used in the third exemplary embodiment. As illustrated in FIG. 21, the ink sheet 6 is formed in such a manner that ink surfaces of the respective colors (only the yellow ink surface $L_Y$ is illustrated in FIG. 21) and the overcoat surface $L_o$ are arranged on the surface of the base sheet $S_p$. Then, a dummy surface $L_D$ having substantially the same dimension as the ink surfaces of the respective colors and the overcoat surface $L_o$ is provided between the ink surface of a predetermined color (the yellow ink surface $L_Y$ in this example) and the overcoat surface $L_o$. The printer apparatus 20 can perform engraving processing on the entire area of the image printed surface of the recording sheet P by using the dummy surface $L_D$.

Further, in a case where the printer apparatus 20 is configured to have a plurality of thermal heads 4, one of the thermal heads 4 can be used in the process B. According to this configuration, the printer apparatus 20 can perform the engraving processing of the process B after full color image printing of the process A. In this case, the printer apparatus 20 can perform the engraving processing over the entire area of the image printed surface of the recording sheet P.

Having described the present invention in detail based on exemplary embodiments thereof, it should be understood that the present invention is not limited to these specific exemplary embodiments. The present invention can be modified in various manners within the scope of the present invention. The modified embodiments are also included in the present invention. The above-described exemplary embodiments only indicate one embodiment of the present invention.

For example, the first and second exemplary embodiments have been described based on a configuration in which the single thermal head 4 performs both the process A and the process B. However, the present invention is not limited thereto. For example, the printer apparatus 20 may be configured in such a manner that the printer apparatus 20 has a plurality of thermal heads, and some of them perform the process A, and the remaining thermal heads perform the process B.

Further, the above-described exemplary embodiments have been described based on a configuration that uses a recording sheet as a recording medium. However, the recording medium is not limited to a recording sheet. The present invention can be employed to any type of thermally deformable recording medium (i.e., a recording medium capable of being embossed by being heated). Further, the above-described exemplary embodiments are configured to form the engraved image M by utilizing a phenomenon that concaves a heated portion. However, the present invention is not limited to this configuration. The present invention can be also employed to a recording medium in which a heated portion expands. This case can also provide the effects of the present invention, although the deformed state (the states of formed concavity and convexity) of the recording medium is opposite from the above-described exemplary embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-068101 filed Mar. 23, 2012, which is hereby incorporated by reference herein in its entirety.

What is claimed is:

1. A printer apparatus configured to transfer ink of an ink sheet to a recording medium by providing a heat amount according to a gradation, the printer apparatus comprising:
   a print control unit configured to control the printer apparatus to transfer an overcoat on a first image, after forming the first image by transferring the ink to the recording medium, and to form, at the time of the transfer of the overcoat, a second image by forming concavity and convexity on the recording medium by controlling a gradation, during the transfer of the overcoat; and
   a selection unit configured to select a glossy mode of the overcoat, wherein the print control unit switches whether to form the second image with a gradation of a drawing region of the second image set higher than a gradation of a drawing peripheral region surrounding the drawing region, or to form the second image with the gradation of the drawing region of the second image set lower than the gradation of the drawing peripheral region surrounding the drawing region, according to the glossy mode selected by the selection unit.

2. The printer apparatus according to claim 1, wherein the first image is a full color image.

3. The printer apparatus according to claim 1, wherein the print control unit controls the printer apparatus to form an edge portion of the drawing region of the second image by using a gradation different from the gradation of the drawing region and the gradation of the drawing peripheral region.

4. The printer apparatus according to claim 3, further comprising a storage unit configured to store a plurality of coefficients having values different from one another,
wherein the print control unit selects one of the plurality of coefficients stored in the storage unit, and sets a gradation of an edge portion of the drawing region of the second image according to the value of the selected coefficient.

5. The printer apparatus according to claim 1, further comprising an image processing unit configured to generate image printing data of the second image by using image data,
wherein the image processing unit generates the second image printing data so that one of the gradation of the drawing region and the gradation of the drawing peripheral region surrounding the drawing region in the image printing data of the second image is higher than the predetermined threshold gradation, and the other of the gradation of the drawing region and the gradation of the drawing peripheral region is lower than the predetermined threshold gradation,
wherein the print control unit controls the printer apparatus to form the second image based on the image printing data generated by the image processing unit.

6. The printer apparatus according to claim 5, wherein the image processing unit generates the second image printing data so that the gradation of the drawing region in the image printing data of the second image is higher than the threshold gradation in a case where a first glossy mode is selected by the selection unit, and generates the second image printing data so that the gradation of the drawing region in the image printing data of the second image is lower than the threshold gradation in a case where a second glossy mode is selected.

7. The printer apparatus according to claim 6, wherein the first glossy mode is a high glossy mode.

8. The printer apparatus according to claim 6, wherein the second glossy mode is a matte mode.

9. The printer apparatus according to claim 5, wherein the image processing unit generates the second image printing data so that a gradation of an edge portion of the drawing region in the image printing data is different from the gradation of the drawing region and the gradation of the drawing peripheral region.

10. The printer apparatus according to claim 1, further comprising a thermal head configure to transfer the ink and the overcoat to the recording medium.

11. A method for controlling a printer apparatus configured to form an image by transferring ink of an ink sheet to a recording medium by providing heat according to a gradation, the method comprising:
    forming a first image by transferring the ink to the recording medium;
    transferring an overcoat onto the first image, and forming, at the time of the transfer of the overcoat, a second image by forming concavity and convexity on the recording medium by controlling a gradation of the transfer of the overcoat;
    setting a glossy mode of the overcoat according to a user's selection; and
    switching whether to form the second image with a gradation of a drawing region of the second image set higher than a gradation of a drawing peripheral region surrounding the drawing region, or to form the second image with the gradation of the drawing region of the second image set lower than the gradation of the drawing peripheral region surrounding the drawing region, according to the set glossy mode.

12. A non-transitory storage medium storing a program that causes a computer
of a printer apparatus, which is configured to form an image by transferring ink of an ink sheet to a recording medium by providing heat according to a gradation, to perform a method comprising:
    forming a first image by transferring the ink to the recording medium;
    setting a glossy mode of an overcoat to be transferred onto the first image according to a user's selection;
    transferring an overcoat onto the first image, and forming, at the time of the transfer of the overcoat, a second image by forming concavity and convexity on the recording medium by controlling a gradation of the transfer of the overcoat; and
    forming the second image with a gradation of a drawing region of the second image set higher than a gradation of a drawing peripheral region surrounding the drawing region, or forming the second image with the gradation of the drawing region of the second image set lower than the gradation of the drawing peripheral region surrounding the drawing region, according to the set glossy mode.

* * * * *